US 6,631,651 B2
Oct. 14, 2003

(12) United States Patent
Petrzik

(54) HYDRAULIC CIRCUIT FOR AN AUTOMATED TWIN CLUTCH TRANSMISSION FOR MOTOR VEHICLES

(75) Inventor: Gunther Petrzik, St. Georgen (DE)

(73) Assignee: Getrag Getriebe-und-Zahnrad-fabrik Hermann Hagenmeyer GmbH & Cie., Ludwigsburg (DE)

(*) Notice: Subject to any disclaimer, the term of this patent is extended or adjusted under 35 U.S.C. 154(b) by 0 days.

(21) Appl. No.: 09/843,432

(22) Filed: Apr. 25, 2001

(65) Prior Publication Data
US 2002/0002878 A1 Jan. 10, 2002

(30) Foreign Application Priority Data
Apr. 25, 2000 (DE) .......................................... 100 20 187

(51) Int. Cl.⁷ .............................. F16N 7/40; F01M 11/02
(52) U.S. Cl. ........................ 74/346; 184/6.28; 184/27.2
(58) Field of Search ........................... 74/329, 331, 333, 74/335, 346; 184/6.1, 6.4–6.9, 6.22, 6.24, 6.28, 27.2, 39; 137/565.22, 565.33

(56) References Cited

U.S. PATENT DOCUMENTS

| 3,760,918 | A | * | 9/1973 | Wetrich et al. ........... 137/625.6 |
| 4,362,084 | A | * | 12/1982 | Walters .................. 137/565.33 |
| 4,520,902 | A | * | 6/1985 | Snow ..................... 184/6.28 |
| 4,976,335 | A | * | 12/1990 | Cappellato ................... 184/6.4 |
| 5,137,498 | A | | 8/1992 | Gunsing |
| 5,341,900 | A | * | 8/1994 | Hikes ...................... 184/6.4 X |
| 5,667,448 | A | | 9/1997 | Friedmann |
| 5,669,479 | A | * | 9/1997 | Matsufuji ............... 184/6.28 X |
| 5,711,730 | A | | 1/1998 | Friedman et al. |
| 5,725,447 | A | | 3/1998 | Friedmann et al. |
| 5,769,182 | A | * | 6/1998 | Parenteau ............... 184/6.22 X |
| 5,868,641 | A | | 2/1999 | Bender et al. |
| 5,879,253 | A | | 3/1999 | Friedmann et al. |
| 5,941,786 | A | | 8/1999 | Van Wijk et al. |
| 5,971,107 | A | * | 10/1999 | Stitz et al. .................. 184/108 |
| 6,017,286 | A | | 1/2000 | Friedmann |
| 6,059,682 | A | * | 5/2000 | Friedmann et al. ..... 192/113.35 |
| 6,129,188 | A | * | 10/2000 | Friedmann et al. ..... 192/113.34 |
| 6,199,441 | B1 | * | 3/2001 | Kanenobu et al. ......... 74/331 X |

FOREIGN PATENT DOCUMENTS

| DE | 38 12 327 | C2 | 1/1990 |
| DE | 195 46 294 | A1 | 6/1996 |
| DE | 196 12 690 | C1 | 6/1997 |
| DE | 198 53 334 | A1 | 5/1999 |
| JP | 362268735 | * | 11/1987 | .................. 74/467 |

OTHER PUBLICATIONS

"Porsche Dual Clutch Transmission", *Automobiltechnische Zeitschrift*, ATZ 89 (1987) 9, pp. 439–452.
Hans–Joachim Förster, Automatisierte *Kraftfahrzeuggetriebe*, Springer Verlag, Germany pp. 31–32, and one page English summary.
Prof. Dr. Backé, et al., "Fluidtechnik für mobile Anwendungen", *RWTH Aachen*, 1$^{st}$ edition, 1996, pp. 317–337, and one page English summary.
Guido Reinartz, "Einsatz von Strahlapparaten in Getrieben", *RWTH Aachen*, 1991, pp. 1–49, and one page English summary.

* cited by examiner

Primary Examiner—Charles A Marmor
Assistant Examiner—Ha Ho
(74) Attorney, Agent, or Firm—Knobbe, Martens, Olson & Bear LLP.

(57) ABSTRACT

A hydraulic circuit, particularly any for an automated twin clutch transmission for motor vehicles, including a countershaft with two parallel power transmission branches, two clutches, a high pressure circuit having at least one actuator for the countershaft transmission and/or the clutches, a low pressure circuit for lubrication and/or cooling of elements of the twin clutch transmission, and a first adjustment pump for the high pressure circuit. The low pressure circuit includes a plurality of secondary pumps which are connected in parallel to the first adjustment pump.

10 Claims, 19 Drawing Sheets

| | SV01 | SV02 | SV03 | SV04 | function | transmission |
|---|---|---|---|---|---|---|
| 0 | 0 | 0 | 0 | 0 | basic cooling for wheel set and clutches | cool |
| 1 | 0 | 0 | 1 | 0 | basic cooling for wheel set and clutches | warm |
| 2 | 0 | 0 | 1 | 1 | basic cooling for wheel set and clutches, external cooling circuit active | hot |
| 3 | 0 | 0 | 0 | 1 | not plausible | |
| 4 | 1 | 0 | 0 | 0 | basic cooling for wheel set and clutch K2, cooling of K1 | cold |
| 5 | 1 | 0 | 1 | 0 | basic cooling for wheel set and clutch K2, cooling of K1 | warm |
| 6 | 1 | 0 | 1 | 1 | basic cooling for wheel set and clutch K2, cooling of K1, external cooling circuit active | hot |
| 7 | 1 | 0 | 0 | 1 | not plausible | |
| 8 | 0 | 1 | 0 | 0 | analog to condition (4) | cold |
| 9 | 0 | 1 | 1 | 0 | analog to condition (5) | warm |
| 10 | 0 | 1 | 1 | 1 | analog to condition (6) | hot |
| 11 | 0 | 1 | 0 | 1 | not plausible | |
| 12 | 1 | 1 | 0 | 0 | basic cooling for wheel set, cooling of K1 and K2 | cold |
| 13 | 1 | 1 | 1 | 0 | basic cooling for wheel set, cooling of K1 and K2 | warm |
| 14 | 1 | 1 | 1 | 1 | basic cooling for wheel set, cooling of K1 and K2, external cooling circuit active | hot |
| 15 | 1 | 1 | 0 | 1 | not plausible | |

Fig. 3

HYDRAULIC CIRCUIT FOR AN AUTOMATED TWIN CLUTCH TRANSMISSION FOR MOTOR VEHICLES

BACKGROUND OF THE INVENTION

1. Field of the Invention

The present invention relates to a hydraulic circuit for an automated twin clutch transmission for motor vehicles, comprising a countershaft transmission with two parallel power transmission branches, and two main clutches, comprising:

a high pressure circuit having at least one actuator for the countershaft transmission and/or the main clutches, a low pressure circuit for lubrication and/or cooling of elements of the twin clutch transmission, and a first adjustment pump for providing a variable high pressure for the high pressure circuit.

Further, the present invention relates to a twin clutch transmission having such a hydraulic circuit.

2. Description of the Related Art

It is a recent tendency to use automated countershaft transmissions and spur gear transmissions in motor vehicles. In such transmissions, manipulating drives operate the shift clutches, particularly synchronizer units, and the starting and separating main clutch.

These automated manual transmissions suffer from an interruption of the traction force during a shifting process, cf. "Automatisierte Kraftfahrzeuggetriebe", Hans-Joachim Förster, Springer Verlag, Germany.

In contrast thereto, the so-called twin clutch transmissions can perform power shifts.

Twin clutch transmissions comprise two main clutches at the input side which can be manipulated separately from each other, wherein one of the clutches is usually assigned to the even gears and the other clutch is usually assigned to the odd gears. A gear change of successive gears is made by operating the two input side main clutches in an interleaving manner. The load at the input side is continuously passed from one power transmission branch of the transmission to the other branch. Thus, power shifts can be performed without interruption of traction force.

A hydraulic circuit for controlling a twin clutch transmission is partially disclosed in the "Automobiltechnische Zeitung ATZ 89 (1987, 9), Porsche twin clutch transmission (in the following referred to as "PDK").

In the PDK, the hydraulic energy generation is divided into two circuits. A pressure-controlled adjustment pump working according to the vane-cell principle supplies the hydraulic control circuit. In the low pressure circuit that is used for lubrication purposes, a constant pump is operated. The two clutches are controlled by proportional pressure reducer valves. The three synchronizer units are each actuated by two 3/2-port control valves, i.e. in total six control valves.

The pressure controlled vane-cell pump for the high pressure circuit is operated on demand. The constant pump for the low pressure circuit supplies the oil in dependence on the speed of the combustion engine.

Constant pumps are advantageous as hydraulic energy supply systems in mobile applications, due to high robustness, low weight, small size and low costs. The supply volume is derived from the requirements at extreme conditions. For all other operational conditions, the supplied amount of volume flow exceeds the necessary amount of volume flow, cf. lecture notes of the lecture "Fluidtechnik für mobile Anwendungen", RWTH Aachen, $1^{st}$ edition, 1990, Prof. Dr.-Ing. W. Backé, Prof. Dr.-Ing. J. Helling.

In the PDK, the supply volume is determined both in the low pressure circuit as well as in the high pressure circuit by the hydraulic operation condition at low engine speeds. With increasing differential speed, the discrepancy between the available supply flow of the pump and the necessary volume flow of the loads increases. Excessive hydraulic power has to be dissipated as a loss volume flow, using a suitable valve control. The losses are generated in a tertiary energy carrier (chemical→mechanical→hydraulic). An electronic control of the pressure level can reduce the influence of the hydraulic circuit. It is the object to reduce the loss producing counterpressure.

Pressure-controlled adjustment pumps allow to adapt the volume flow to the demand. The dependency from the engine speed exists only at maximum adjustment. Thus, those pumps are close to being an optimum solution from an energetic viewpoint, because the volume flow has the highest contribution to losses.

Within a project DKG 430 it was proposed by the assignee of the present invention, to provide an adjustment pump not only for the high pressure circuit but also for the low pressure circuit. Thereby, the energy consumption can be further optimized. However, this solution needs improvement with respect to costs and weight.

For the control or closed-loop control of the clutch function, the PDK uses proportional 3/3-port pressure reducer valves. These valves convert an impressed magnetic coil current into a hydrostatic pressure. The hydrostatic pressure acts onto the manipulating area of a hydraulic cylinder and impresses a manipulating force onto the clutch mechanics.

The hydraulic mechanical closed-loop control is made via a mechanical balance at the valve gate.

Proportional pressure reducer valves have, in general, the following disadvantages:

The magnetic hysteresis results in a width of backlash in the hydrostatic pressure.

The hydraulic mechanical control of the pressure reducer valve is subject to thermal influences. Stability and attenuation are changed with changes in temperature.

In dynamic processes where volume changes arise in the hydraulic drive (cylinder), the direct pressure feedback cuts off or on the volume flow before the target pressure is achieved. This has a negative influence on the movements that have to be made. The open-loop transfer function in which elasticity, compressibility, friction and inertia act, does not allow an exact assignment of magnetic current to the momentary hydrostatic pressure of dynamic processes.

In general, the hydraulic clutch control of the PDK has the following disadvantages:

The dynamics limit the momentary supply volume of the pump. The adjustment process of the pump requires reaction time. In this time, the pump adapts its feed volume to the induced demand of the drives. A constant pump supplies the momentary supply flow of the pump. In the constant pump, an increase of the supply amount leads to higher losses at higher rotational speeds.

The lack of electronic feedback of the pressure is disadvantageous for the control optimization; any diagnosis for monitoring the clutch function is made difficult.

In the PDK, there exists a safety hazard because of transmission blockages in case of malfunctions of the pressure reducer valves.

The dry main clutches used in the PDK are difficult to control.

On the other hand, wet clutches need an active cooling oil control in view of the effect of the impressed cooling oil amount on the drag torque of the clutch; the constructional expenditure is increased if this object is to be solved by a magnetic valve.

The operation of the synchronizer units in the PDK is performed on an electro-hydraulic basis. Each synchronizer unit is controlled by a drive, consisting of a double-acting cylinder and two 3/2-port control valves. The cylinder drive comprises two springs. In a fail safe position, the cylinder is in its central position. In this cylinder position, the synchronizer unit is in its neutral position.

In view of the fact that each synchronizer unit needs a double-acting cylinder and two 3/2-port control valves, the PDK has high costs, requires a high technical expenditure and a large amount of elements.

The actuating forces cannot be proportioned with the control valves which are on-off valves. Thus, shift noises occur, the load on the elements is high, the synchronizer force cannot be adjusted and the position cannot be closed-loop controlled (neutral, synchronous).

In view of the fact that the fixation is made by means of springs, the pressure has to maintain the engaged gear, the costs are high. Further, disengagement of a gear has to be made by spring forces.

Also, there are no means for externally locking inadmissible actuations of synchronizer units.

It is also known in the art to actuate the synchronizer units of automated transmissions with a gear selector drum, which drum is driven by an electrical motor (e.g. DE 196 12 690 C1). Electrical motor manipulating drives have some advantages over electro-hydraulic drives, and are particularly easy to be controlled.

However, electric motor drives are disadvantageous in view of the mass of electro-hydraulic drives, the current load on the electrical onboard power supply, the large space required, the comparably low adjustment speed, and the comparably low available adjustment torque. Further, one electrical motor is necessary for each degree of freedom to be realized.

The mass moments of inertia are determined by the electrical motor and an associated spur gear stage.

In the field of continuously variable transmissions, it is further known (DE 195 46 294 A1) to connect the discharge opening of a pressure chamber with the input of a jet pump, the suction line of which being connected with a fluid reservoir.

The pressure chamber can be fed by a pump and serves to generate a hydraulic pressure which produces a bias force between taper-disk sections and a transfer steel band.

The jet pump is used to provide a larger fluid volume for lubrication and/or cooling purposes.

At the suction jet side of the jet pump, a check valve is provided which opens in suction direction. Thus, it is ensured that the oil volume arriving at the input side at low temperatures is fed to the elements to be cooled or lubricated.

In a paper prepared at the RWTH Aachen by Guido Reinatz with the title "Einsatz von Strahlapparaten in Getrieben", 1991, the use of jet pumps for oil supply in hydraulic equipment is known.

In general, the use of jet pumps in transmissions of motor vehicles has two major disadvantages:

1. Jet pumps are hydrodynamic pumps and are largely dependent on the counterpressure. The large temperature range of motor vehicles, with changes in viscosity of three orders of magnitude, set a technical limit for hydrodynamic pumps.
2. Jet pumps are constant pumps. They may be arranged and optimized for a certain hydraulic and thermal operational condition. The optimum efficiency to be achieved is 50%. In all other operational conditions, considerable decreases in efficiency have to expected.

The object of the present invention is to provide an improved hydraulic circuit for an automated twin clutch transmission for motor vehicles.

SUMMARY OF THE INVENTION

The above object is achieved according to a first aspect of the present invention by a hydraulic circuit, as mentioned at the outset, wherein the low pressure circuit comprises a plurality of second pumps which are connected in parallel to the first adjustment pump.

Thereby, the power consumption can be lowered in many operational conditions.

It is particularly preferred and a second aspect of the present invention, if at least one of the second pumps is a jet pump, the driving jet side of which being connected to the output of the first adjustment pump.

Thereby, the at least one jet pump can either fully or at least for some lubrication and cooling purposes, replace a mechanically driven low pressure pump which would otherwise be necessary.

The supply of the jet pumps by means of a pressure-controlled adjustment pump makes the jet pump superior over a constant pump.

In a particularly preferred embodiment, the driving jet side of at least one of the jet pumps is connected to the output of the first adjustment pump via an on-off valve.

It is particularly preferred, if the on-off valve is temperature-controlled.

In accordance with another preferred embodiment is the suction jet side of the jet pump connected to an oil sump or a fluid supply via the on-off valve.

The concept of feeding the jet pumps by a pressure-controlled adjustment pump as well as the concept of controllability of the jet pump is superior over a constant pump. The efficiency of jet pumps is comparably low, making reference to the mechanical power that would have to be produced (approximately smaller than 50%). However, the mechanical power demand is not dependent from the engine speed and can be reduced to a volume flow of approximately zero when switched off.

The adjustment pump lowers the power demand in the high pressure circuit. In between shift processes, it is only necessary to provide a balance for leakages in the system and the active clutch.

The combination of controllable jet pumps and a pressure-controlled adjustment pump has several advantages over known supply systems of the low pressure circuit of an automated twin clutch transmission:

1. It is not necessary to provide a hydraulic mechanical pump for the low pressure circuit.
2. The energy consumption is lowered in many operational conditions.
3. The weight and the costs are lowered, particularly if the jet pumps are made of plastic material.
4. The drive torque that is determined by the adjustment pump is reduced during cold starts.

5. The arrangement of the jet pumps within the transmission is flexible, for instance close to loads, so that the counterpressure is reduced.
6. The availability is high due to lack of moving parts.
7. The wear of jet pumps is particularly low.
8. The pressure level in the low pressure circuit is lowered to smaller volume flows by grouping into partial circuits, and the lines are shorter.

The adjustment speed of the adjustment pump is sufficient for the objects in the lubrication and cooling circuit. By means of the use of the on-off valve (particularly a stop valve), no losses occur. The driving current for the jet pumps can be taken directly from the adjustment pump so that unnecessary attenuation losses (e.g. due to a check valve) can be prevented.

For the high pressure circuit, it is particularly preferred if an energy storage (i.e. gas membrane storage) is provided which is preferably decoupled from the low pressure circuit by a stop valve.

Thereby, the availability of the stored pressure oil is ensured. The combination of the energy storage (or hydrostorage) with the first adjustment pump gives raise to the following advantages:
1. Losses in between shift processes are minimized.
2. The system pressure is constant.
3. There is no influence from the engine speed.

Further, the energy storage shortens the closing times of the clutch and improves the closed-loop controllability due to nearly constant pressure conditions on the side of the system pressure. It is further advantageous that the supply current of the pump does not have an influence on the closure times of the clutch and on the shift function.

In accordance with a particularly preferred embodiment is the temperature-controlled jet pump with its driving jet side connected via a restriction to an output of the first adjustment pump, in parallel to the on-off valve.

Thereby, a basic supply of the devices of the twin clutch transmission to be cooled or lubricated, is ensured even if the on-off valve is switched off.

Preferably, the cross section of the aperture of the restriction is temperature-controlled.

Thereby, the basic supply can be adjusted in dependence on the temperature.

In accordance with another preferred embodiment, at least two jet pumps are arranged in series. Thereby, it is possible to connect the output side of one jet pump with the suction jet side of a second jet pump. Such an arrangement has a number of advantages. On the output side of the first jet pump, the counterpressure is lower. Higher output volume flows can be realized if the second jet pump is connected in series to the first jet pump ("pipeline principle").

In accordance with another preferred embodiment, one of the jet pumps is connected to a cooler with its output side, wherein the output of the cooler is connectable to the suction jet side of another jet pump.

Thereby, the further jet pump is supplied with cooled oil from the cooler.

Generally, it is preferable if at least one of the jet pumps is connected with its output to a cooler.

It will be understood that this jet pump is preferably connected to the output of the first adjustment pump via a temperature-controlled on-off valve. At high temperatures, this jet pump is additionally switched on, and the oil is cooled.

It is advantageous if the output mixture volume flow of at least one of the jet pumps lubricates and/or cools the wheel sets and/or the shift clutches of the countershaft transmission.

In accordance with another preferred embodiment, the output mixture volume flow of at least one further jet pump cools the main clutches (the clutches arranged between the engine and the countershaft transmission).

Preferably, the low pressure circuit comprises four pumps, two of the four pumps being associated to the two main clutches, one to the transmission and one to the oil cooler.

If the four pumps are each connected to the output of the first adjustment pump via on-off and stop valves, respectively, 16 different shift conditions are theoretically possible. Thus, the lubrication and/or cooling of the transmission and/or the main clutches can be established as required.

Preferably, the jet pumps are controlled on the suction jet side and the driving jet side. Controlling the driving jet allows to adjust to the hydraulic demand. Locking the suction terminal avoids negative effects due to counterpressure in the mixture tube. A loss of driving current via the suction terminal is controllable. Namely, a decrease in oil temperature leads to an extreme increase in viscosity and, conclusively, in the flow resistance in the mixture tube.

The manipulating elements or actuators for the switchable or controllable jet pumps can be mechanical, hydraulical-mechanical, thermal-mechanical, and electrical-mechanical systems. It is preferred if the main clutch cooling is controlled on a hydraulic-mechanical basis, and if the basic cooling and the cooler flow is controlled on the basis of a thermal-mechanical concept. It is further preferred if all on-off valves are identical. If the switch position is passive, the lines for the suction jet and the driving jet are locked (or blocked). In the active switch position of the valves, these lines are released.

The manipulating elements for the thermal-mechanical control can be implemented as expansion elements (as are available from Behr-Thomson), or bimetal elements.

The jet pumps for the clutch cooling are preferably hydraulically controlled. An active control of the pressure can be conducted for instance via a hydraulic side function (auxiliary function) of the clutch valves, or via a magnetic valve (on-off valve or pressure control valve).

In accordance with a further aspect of the invention, the high pressure circuit comprises for each of the two main clutches an actuator and a proportional directional control valve.

A proportional directional control valve allows to electronically correct a magnetical hystereses and friction in the manipulating cylinder. Further, the closed-loop control quality can be increased by improving stability and attenuation. The timing of the control can be tightened by an electronic monitoring. Further, malfunctions of the clutch behavior can be determined early (diagnosis function).

The closed-loop control of the mechanical condition of the clutches is preferably implemented by a digital pressure control of the piston pressure in a single acting manipulating cylinder being the actuator. The modulation of the hydrostatic pressure is controlled via the input volume flow and the output volume flow.

It is particularly preferred, if the proportional directional control valves each have an initial position in which the associated clutch is open and in which a control output for a side function is locked.

Rather than locking the control output (passive side function), it is also possible to open the control output in the initial position (rest position), so that the control output is active.

Since a proportional 3/3-port directional control valve would be fully sufficient for the control purposes of the clutch actuator, it is possible by enlarging the functions in the hydraulic portion of the clutch valves, to save further magnetic valves. The clutch valves take over their job.

It is known in the art (direct shift gear box of the Volkswagen Lupo 3L), that a clutch valve switches the pressure line to the transmission actuator in a side function. In this case, the pressure line is locked in the currentless condition. The leakage of the downstream gate valves is reduced and the pressure in the pressure line is lowered.

In the present case, it is not only such a side function that is realized. It is possible within the frame of the invention, in addition or alternatively, to select manipulating drives for the synchronizer units and the shift clutches, to activate a clutch cooling, and/or to control clutch restrictions.

The hydraulic control of the clutch cooling as well as the selection, the locking and the release of manipulating drives are objects which are functionally connected to the respective clutch of a twin clutch transmission.

In general, it would be possible to utilize the condition of the clutch for control purposes. In this case, for example the clutch pressure may serve to select and/or lock manipulating drives for the synchronizer units.

In view of the fact that a proportional directional control valve is provided for each of the two clutches of the twin clutch transmission, it is possible to combine the side functions of the two valves.

It is particularly preferred if the proportional directional control valves each have another initial position, in which the associated clutch is closed and in which the control output is locked (or opened).

Thereby, the proportional directional control valve is enhanced by two shift positions. The side function which is integrated into the hydraulic section is based in this case on a two edge control. Thus, it can be achieved that the side function is not dependent on which of the two clutches is active and which passive, and is always constant. In a twin clutch transmission, one clutch is generally active and the other one passive. In this condition, the clutch valves are switched in an opposite manner. The side function can be chosen identical when using a two edge control, independent on these clutch valve conditions. It is to be understood that a symmetrical characteristic is particularly preferred.

It will also be understood that such a coupling of primary and side functions in a proportional directional control valve for a clutch provides that the control dependencies are unambiguous.

It is preferred if the two initial positions (or the two further positions) are opposite end positions of the proportional directional control valves.

Thereby, a symmetrical characteristic can be achieved.

It is further preferred if the proportional directional control valves for driving the actuators for the two main clutches are 4/5-port directional control valves.

It is preferred if the side function is used to release an actuator for a shift clutch of the countershaft transmission.

It is further preferred if the release of the actuator is made by a combination of the control outputs of the side functions of the two proportional directional control valves.

As indicated above, it is particularly preferred if the side function is the cooling of the clutch that is assigned to the respective proportional directional control valve.

In accordance with another aspect of the present invention, a hydraulic safety circuit is provided in the high pressure circuit, which prevents that the two main clutches are closed simultaneously.

Thereby, it is already in the area of the hydraulic circuit, that safety is provided to prevent transmission blockages, and not only at the mechanical end.

It is particularly preferred if the safety circuit comprises a logical reducer valve, wherein the control output is the smaller control pressure of the control pressures of the two actuators of the two clutches.

Thereby, it is comparably easy to compare the smaller control pressure of the actuators with a predetermined threshold. As soon as the smaller control pressure exceeds the threshold, there exists the danger that both clutches of the twin clutch transmission are closed. In such a case, appropriate safety measures are to be initiated.

In accordance with another preferred embodiment, another hydraulic safety circuit is provided in the high pressure circuit for a pressure sensor.

Thereby, a hydraulic emergency function can be realized by modulating the clutch pressure, if a pressure sensor breaks down.

It is particularly preferred if the further safety circuit comprises at least one restriction in a parallel branch, which provides a characteristic of pressure versus manipulating value of a valve for pressure control, wherein the manipulating value can be compared with a corresponding value of the pressure sensor.

Thereby, a modulation of for instance the clutch pressure can be made similar to a shift force control by means of a restriction control. The constant restrictions may either be activated on demand by an emergency valve, or act permanently within the control range of the clutch. The control oil flow is increased during shift processes only.

It is particularly preferred, if the control oil flow through the restriction is used for cooling/lubrication.

The inventive object is also achieved by a twin clutch transmission having a hydraulic circuit as described above.

Further advantages and features will become apparent from the following description of preferred embodiments. It will be understood that the above-mentioned features and those to be discussed below are not only applicable in the given combinations, but may also be present in other combinations or taken alone without departing from the scope of the present invention.

Particularly, the features of the invention can be applied to hydraulic circuits of any transmissions, not only twin clutch transmissions. Further, it is not necessary to divide the hydraulic circuit into a high pressure circuit and a low pressure circuit.

BRIEF DESCRIPTION OF THE DRAWINGS

Embodiments of the invention are illustrated in the drawings and are discussed in the following description.

FIG. 3 is a table with conditions of jet pumps of the low pressure circuit of FIG. 2;

DETAILED DESCRIPTION OF THE PREFERRED EMBODIMENTS

Figure 1:
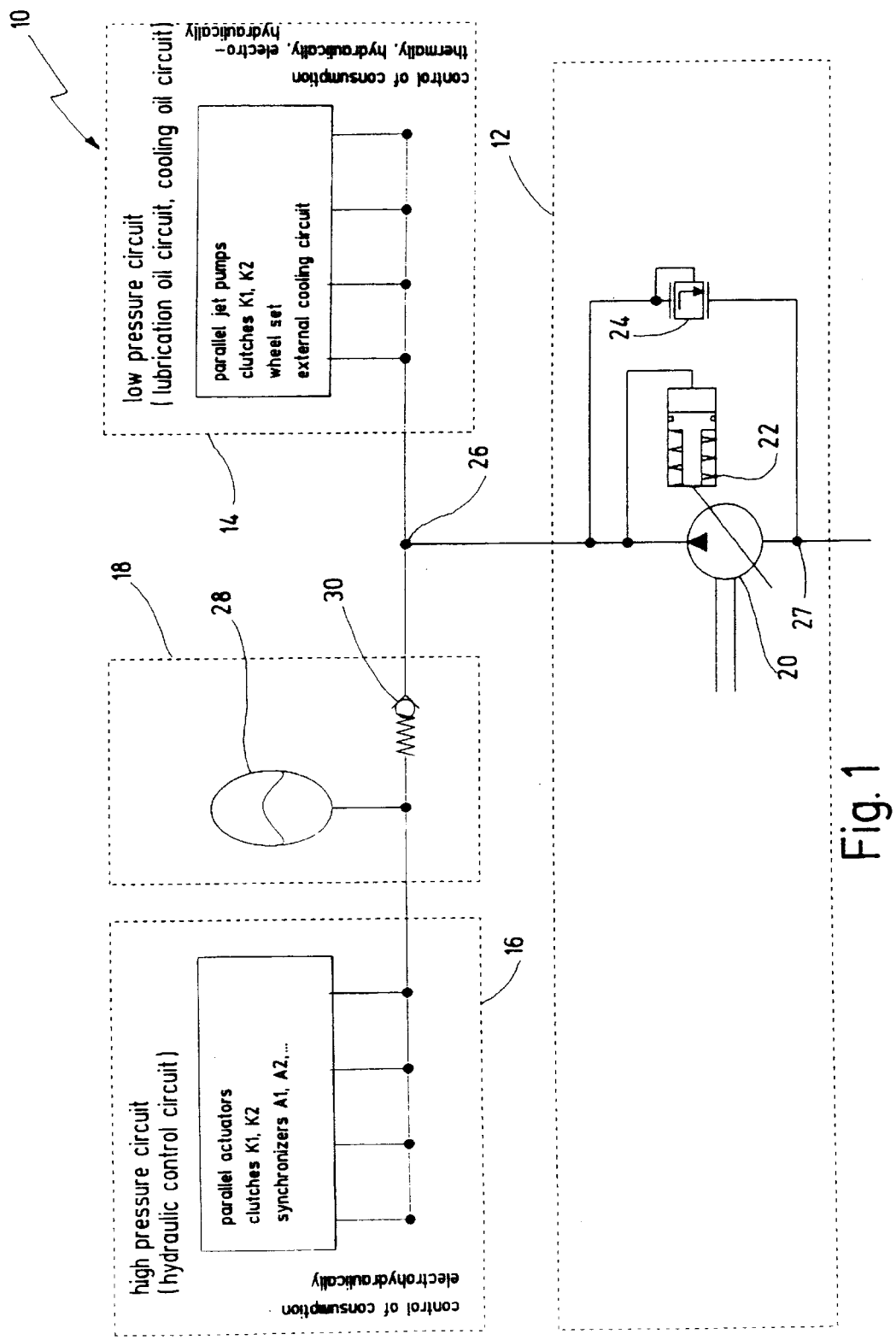
FIG. 1 is a diagram of an embodiment of the inventive hydraulic circuit for an automated twin clutch transmission.

An embodiment of the inventive hydraulic circuit is shown in FIG. 1 and is generally given the reference numeral 10. The hydraulic circuit 10 includes a hydraulic energy generation section 12, a low pressure circuit 14, a high pressure circuit 16, and an energy storage section 18.

The hydraulic energy generation section 12 comprises a hydraulic adjustment pump 20 which can be adjusted by means of a pressure controller 22. In addition, a pressure limiter 24 is provided in a manner as known in the art.

The output of the adjustment pump 20 is shown at 26. The input 27 of the adjustment pump 20 is connected to an oil sump and oil reservoir, respectively, which are not shown in greater detail.

The output 26 of the adjustment pump 20 is, on the one hand, coupled to the low pressure circuit 14, and, on the other hand, with the energy storage section 18. The energy storage section 18 is provided between the output 26 of the adjustment pump 20 and the high pressure circuit 16.

The energy storage section 18 comprises an energy storage 28 of any design, and a stop valve 30.

Thus, the pressure in the high pressure circuit 16 is stabilized. The stop valve 30 guarantees the availability of the stored pressure oil.

The adjustment pump 20 is selected so that its adjustment speed is sufficient for the operation in the low pressure circuit 14.

The low pressure circuit 14 is used for lubrication and for cooling of elements of the twin clutch transmission for which the hydraulic circuit 10 is designed. The primary hydraulic target in the low pressure circuit 14 is the volume flow. The hydrostatic pressure merely serves to overcome flow resistances which result from the adjusted volume flow.

The meshing wheels, the sliding sleeves, and the bearings of the shafts of a countershaft transmission of the twin clutch transmission are cooled and lubricated by means of the lubrication, particularly being an injection lubrication. In addition, the low pressure circuit 14 serves to dissipate heat which is generated in the two main clutches of the twin clutch transmission, wherein the heat results from friction occurring at differential rotary speeds.

The necessary oil amounts are determined by the local thermal conditions of the elements. The necessary external cooling power is determined by the global thermal condition of the transmission.

The primary target of the high pressure circuit 16 is the hydrostatic pressure. The required pressure oil which has to be provided by the adjustment pump 20 is determined by the condition of the actuators for the countershaft transmission (shift and transmission actuators) and by the main clutches as well as by the use of the energy storage 28.

With using the energy storage, the consumption of pressure oil is in the present embodiment in the range between 1 l/min and 12 l/min. A volume flow of 1 l/min is necessary for compensating leakages at shift breaks. During the shifting process, the consumption increases to 12 l/min due to the necessary dynamics of the drives.

If the energy storage 28 is used, the consumption of pressure oil can be reduced during the shifting process to a maximum charge volume flow of e.g. 4 l/min. This volume flow is sufficient for compensating oil losses.

Figure 2:
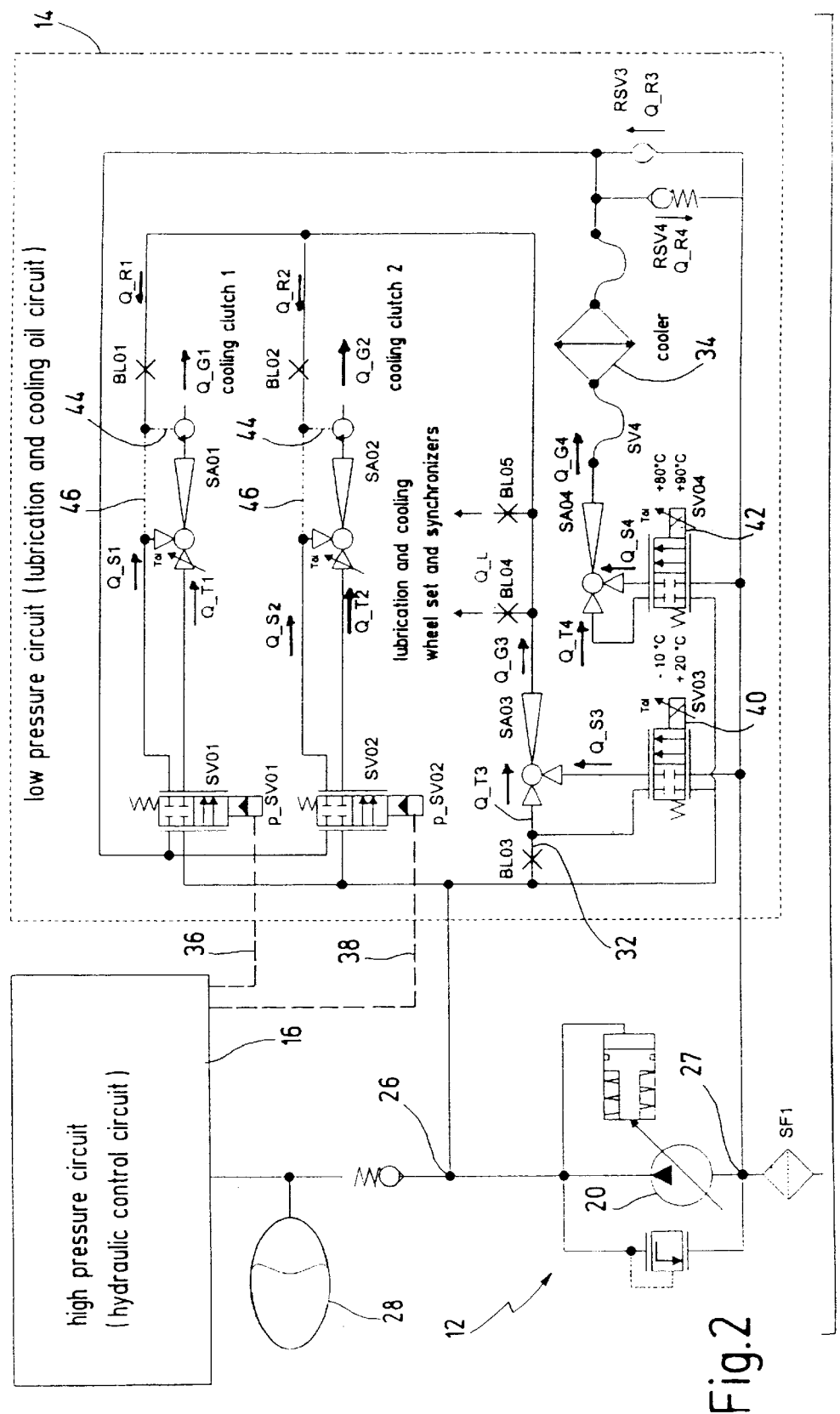
FIG. 2 is a diagram of an embodiment of a low pressure circuit of the hydraulic circuit of FIG. 1.

FIG. 2 depicts an embodiment of a low pressure circuit 14 for the hydraulic circuit 10 as shown in FIG. 1.

The low pressure circuit 14 is, on the one hand, connected to the output 26 of the adjustment pump 20 and, on the other hand, to the input 27 of the adjustment pump 20. The input 27 of the adjustment pump 20 is connected with an oil sump via a filter SF1.

The low pressure circuit 14 comprises four jet pumps (or jet apparatus) SA01, SA02, SA03, and SA04, which are arranged in parallel.

The jet pumps are, with their driving jet side, connected in parallel to the output 26 of the adjustment pump 20. The respective suction jet sides of the jet pumps SA are connected in parallel to the input 27 of the adjustment pump 20.

The connections between the input 27 and the output 26 as well as the driving jet sides and the suction jet sides of the jet pumps SA can be switched on and off. To this purpose, four on-off valves SV01, SV02, SV03, and SV04 are provided, each being a 4/2-port directional control valve.

The on-off valves SV are identical. In an initial position into which the on-off valves are biased by means of a spring, the driving jet side and the suction jet side of the respective jet pumps SA are disconnected from the output 26 and the input 27, respectively. In the second position of the on-off valves SV, the respective driving jet sides are connected to the output 26, and the respective suction jet sides are connected to the input 27.

The jet pumps SA01 and SA02 are used for cooling the two clutches of the twin clutch transmission. To this purpose, the on-off valves SV01 and SV02 are hydraulically controlled (p__SV01, p__SV02). If the clutch 1 of the twin clutch transmission is to be cooled, the on-off valve SV01 is switched on. A volume flow Q__T1 flows into the driving jet side of the jet pump SA01, a volume flow Q__S1 into the suction jet side. Under the effect of the operation of the jet pump, these two volume flows are mixed and the clutch 1 is cooled with the mixture volume flow Q__G1.

The clutch 2 is cooled in an analogous manner via on-off valve SV02, independent from the cooling of clutch 1.

The jet pump SA03 serves for lubricating and cooling the wheel sets and the synchronizers and the synchronizer assembly, respectively, of the counter shaft transmission of the twin clutch transmission.

The associated on-off valve SV03 is temperature-controlled and may, for example, be switched on at threshold values in the range of −10° C. to +20° C. Typical threshold values are 0° C. or +10° C.

In other words, the on-off valve SV03 is switched off at low temperatures below the threshold temperature. When switched on, a volume flow Q__T3 flows into the driving jet side of the jet pump SA03, and a volume flow Q__S3 flows into the suction jet side. A mixture volume flow Q__G3 exits from the jet pump SA03. Usually, the volume flow Q__G3 is identical to a volume flow Q__L for cooling and lubricating the countershaft transmission. The volume flow Q__L may be fed by means of a plurality of parallel lines and restrictions BL04, BL05 to the transmission.

In order to provide lubrication for the transmission at temperatures below the threshold temperature determined by the on-off valve SV03, the driving jet side of the jet pump SA03 is connected to the output 26 of the adjustment pump 20 via a parallel branch 32 that is arranged parallel to the on-off valve SV03. A restriction BL03 is arranged in the parallel branch 32. A volume flow flows continuously via the parallel branch 32 into the jet pump SA03. At temperatures below the threshold temperature, this volume flow flows directly through the jet pump SA03 and serves as a basic volume flow so as to lubricate elements of the transmission. In view of the fact that the suction jet side of the jet pump SA03 is closed by the on-off valve SV03 at temperatures below the threshold temperature, a situation can be avoided that a part of the oil flow introduced via the parallel branch 32 flows off via the suction jet side, due to a banking-up pressure. Thus, at temperatures below the threshold temperature, the output volume flow Q__G3 is identical to the input volume flow Q__T3.

The fourth on-off valve SV04 is associated to the fourth jet pump SA04 and is also temperature-controlled. At temperatures below a threshold value of e.g. 90° C. (the threshold value may be adjustable for instance in a range between 80° C. and 90° C.), the on-off valve SA04 is switched off and the jet pump SA04 does not operate. Above this second threshold temperature, the jet pump SA04 operates and the output mixture volume flow Q__G4 is fed to an oil cooler 34. The output of the oil cooler 34 is connected via a check valve RSV4 to the oil sump (input 27). Thus, a cooled volume flow Q__R4 flows via check valve RSV4 into the oil sump. The volume flow Q__R4 is usually identical to the volume flow Q__G4.

The hydraulic control terminals p__SV01 and p__SV02 of the on-off valves SV01 and SV02, respectively, are connected to the high pressure circuit 16 via hydraulic control lines 36 and 38, respectively. The function of the lines 36, 38 will be explained in detail below. In general, a switching signal is given via one of the lines 36, 38 when one of the two clutches of the twin clutch transmission is operated and heat is generated in view of the friction therein, which heat has to be dissipated by suitable cooling measures.

The temperature control of the on-off valve SV03 is shown in FIG. 2 at 40, the temperature control of the on-off valve SV04 at 42.

The output of the oil cooler 34 is connected to a line which leads from the input 27 of the adjustment pump 20 to the suction jet sides of the on-off valves SV01, SV02. Another check valve RSV3 is connected between this terminal and the input 27, said check valve RSV3 ensuring that oil does not flow back via the suction jet sides of the on-off valves SV01, SV02 into the oil sump. The check valve RSV3 is not spring-biased. However, the check valve RSV4 is spring-biased.

In addition, FIG. 2 shows that the output volume flow Q__G3 of the jet pump SA03 for establishing a basic lubrication of the clutches 1 and 2 is split into the volume flow Q__L for the transmission and a volume flow Q__R1 for the clutch 1 and a volume flow Q__R2 for the clutch 2.

To this purpose, the output of the jet pump SA03 is either connected with the output sides of jet pumps SA01, SA02 (via a respective line 44). Alternatively, the output of the jet pump SA03 can be connected with the suction jet sides of the jet pumps SA01, SA02 (via respective lines 46). Restrictions BL01 and BL02 are provided in the respective lines from the output of the jet pump SA03 to the jet pumps SA01 and SA02, respectively.

In the present case, it is assumed for further discussion of the invention, that the first threshold temperature of the on-off valve SV03 is 0° C., and that the second threshold temperature of the on-off valve SV04 is 90° C. In the present context, any values below the first threshold temperature are referred to as "cold", values between the two threshold temperatures are referred to as "warm", and values above the second threshold temperature are referred to as "hot".

The operation of the low pressure circuit 14 of FIG. 2 is explained below with reference to FIGS. 3 to 6.

FIG. 3 is a table of the possible conditions of the four on-off valves SV01 to SV04.

For example, in condition 0, in which condition each of the four on-off valves SV is switched off, the wheel sets and the clutches are basically cooled via the parallel branch 32 and the jet pump SA03. When it becomes warm, the jet pump SA03 is switched on via on-off valve SV03. In this condition, the driving jet side oil volume flow Q__T3 is mixed with a—larger—suction volume flow Q__S3, and a larger volume flow Q__G3 is provided for the wheel sets and the clutches.

When it becomes hot, the on-off valve SV04 is switched on, and the oil is cooled via the cooler 34 and is guided via check valve RSV4 back into the oil sump and is mixed there with the hot oil.

Conditions 4 to 6 relate to corresponding conditions of the low pressure circuit 14, wherein, in addition, the clutch 1 is cooled (the on-off valve SV01 is switched on). Correspondingly, on-off valve SV02 is switched on in conditions 8 to 10 for cooling clutch 2. In conditions 12 to 14, both clutches are cooled.

Figure 4:
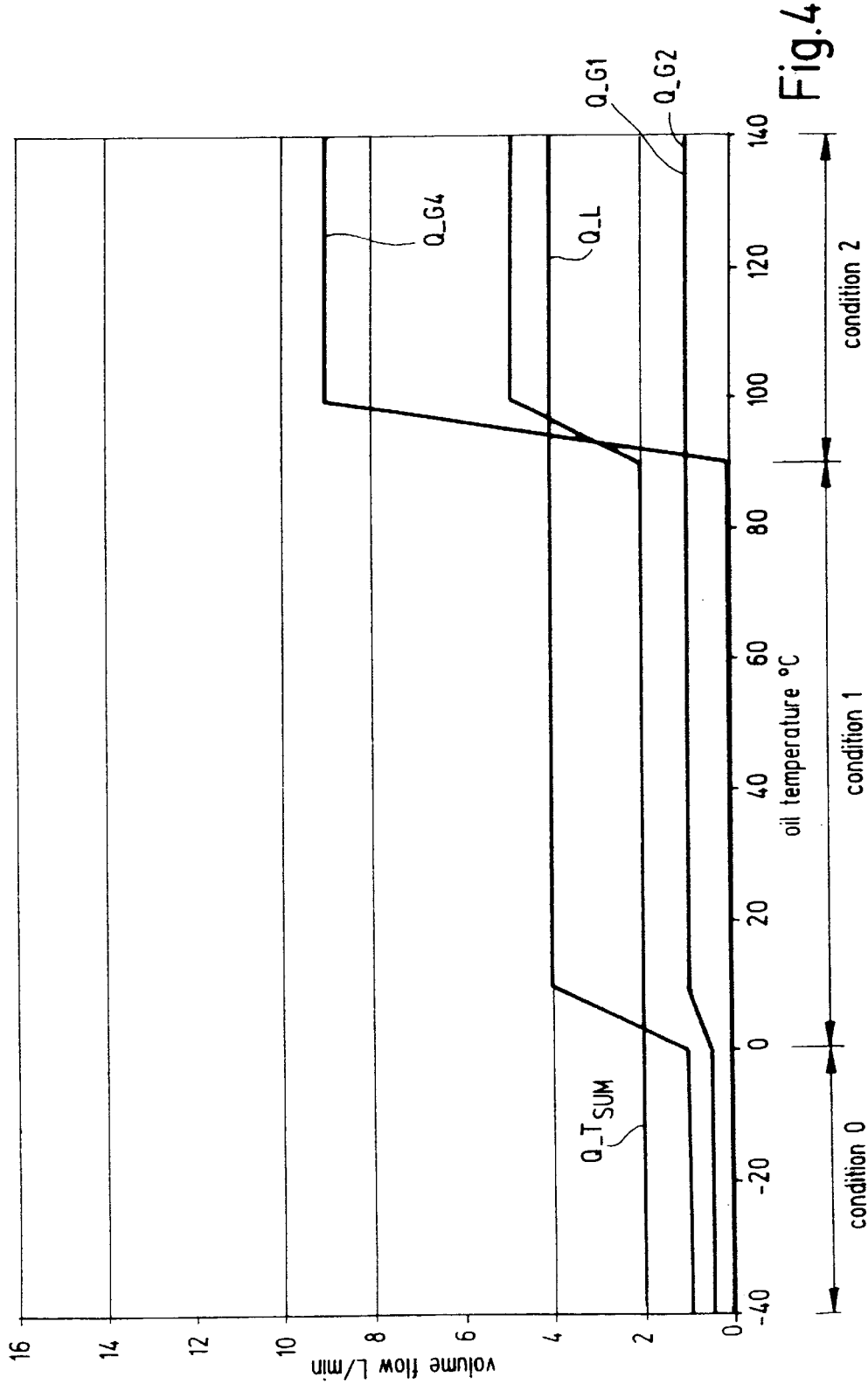
FIG. 4 is a diagram of the volume flow versus the oil temperature for three conditions given in FIG. 3.

Conditions 0, 1 and 2 are shown in FIG. 4 in a diagram of the volume flow in l/min versus the oil temperature in °C.

It may be taken from this diagram, that the volume flows Q__L, Q__G1, and Q__G2 are approximately 1 l/min and 0.5 l/min, respectively, if the temperature is below the first threshold temperature of 0°C. (supply is made via branch 32 with restriction BL03). In the warm operating condition "1", the volume flows are increased to approximately 4 l/min and 1 l/min, respectively. In the hot condition, a mixture volume flow Q_G4 of 9 l/min is supplied via jet pump SA04 and is cooled via cooler 34. The sum of all driving jet side flows Q_T$_{sum}$ is also shown in FIG. 4.

The restriction BL03 controls the oil supply to a volume flow of approximately 2 l/min. This volume flow is distributed to the transmission and the clutches. In the warm condition, the operating jet pump SA03 sucks a volume flow of 4 l/min, so that the mixture volume flow Q_G3 is 6 l/min.

Figure 5:
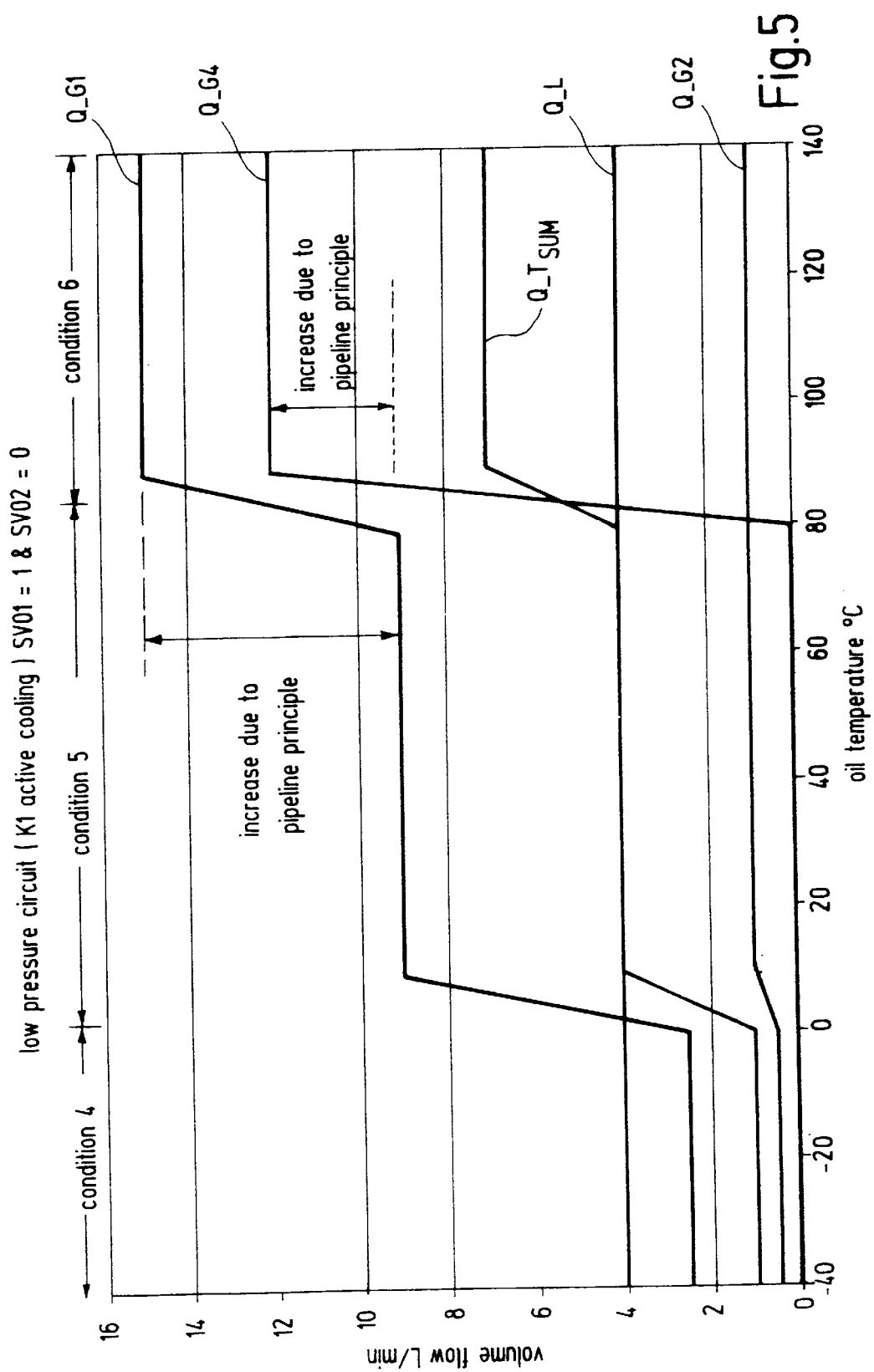
FIG. 5 is a diagram of the volume flow versus the oil temperature for further conditions shown in FIG. 3.

FIG. 5 is a similar diagram as FIG. 4, for conditions 4 to 6.

It will be understood that the diagram of conditions 8 to 10 would be identical as for conditions 4 to 6, wherein the volume flows Q_G1 and Q_G2 are exchanged.

It can be seen that the output volume flow Q_G1 for clutch 1 is increased to approximately 15 l/min, due to the connection of the output of the cooler 34 and the suction jet side of the jet pumps SA01, SA02, establishing a "pipeline principle", in the hot condition. In view of the fact that a suction effect occurs at the output of jet pump SA04 via the suction jet side of jet pump SA01, the output volume flow Q_G4 is increased against the situation in FIG. 4, to 12 l/min.

Figure 6:
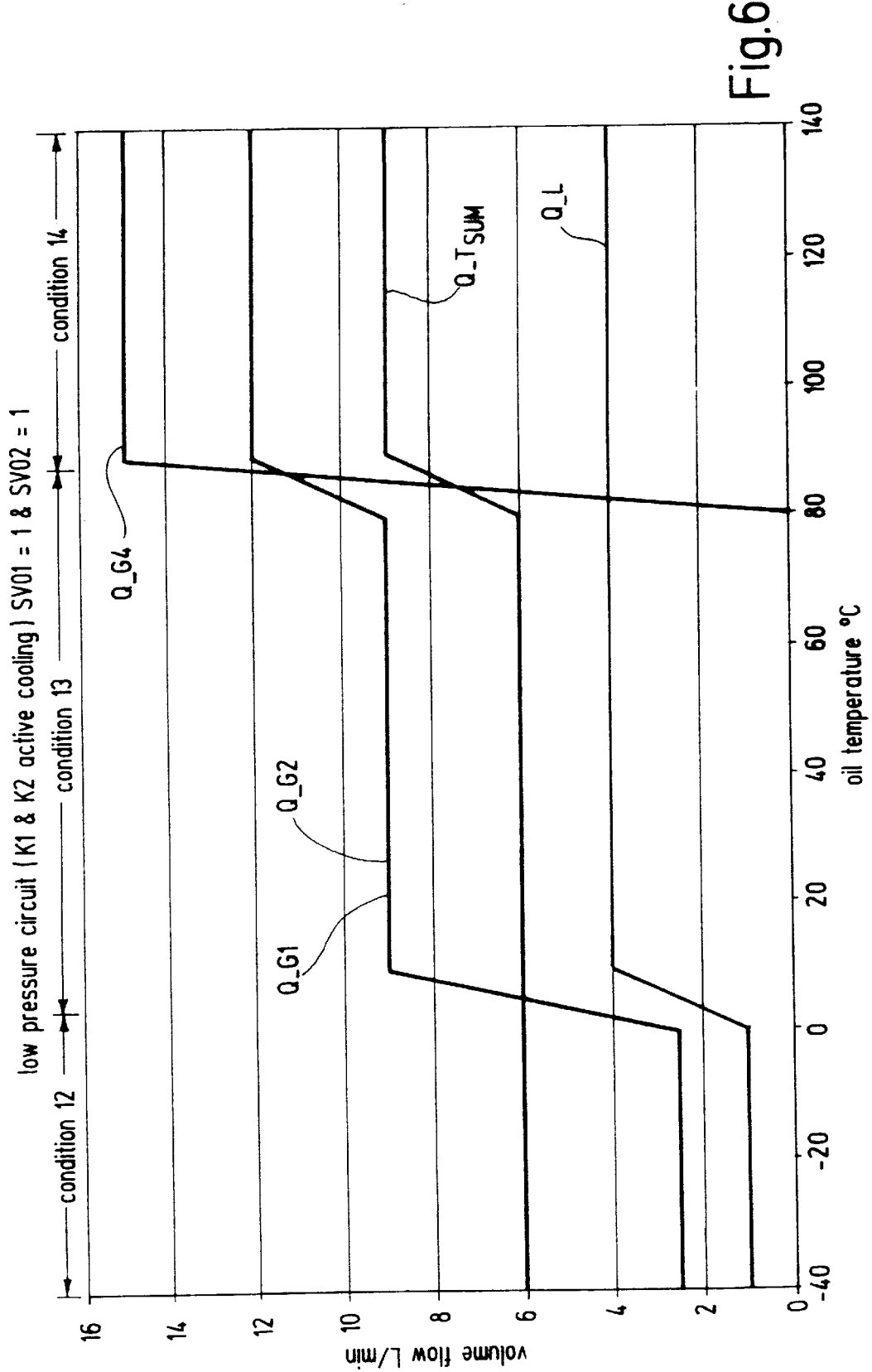
FIG. 6 is a diagram of the volume flow versus the oil temperature for further conditions shown in FIG. 3.

Finally, FIG. 6 depicts conditions 12 to 14, in which conditions both clutches are cooled.

Again, the pipeline principle can be recognized. In view of the suction effect of the two jet pumps SA01, SA02, the output volume flow Q_G4 of jet pump SA04 is increased to 15 l/min. The result is a mixture volume flow of 12 l/min for each of the clutches.

Figure 7:
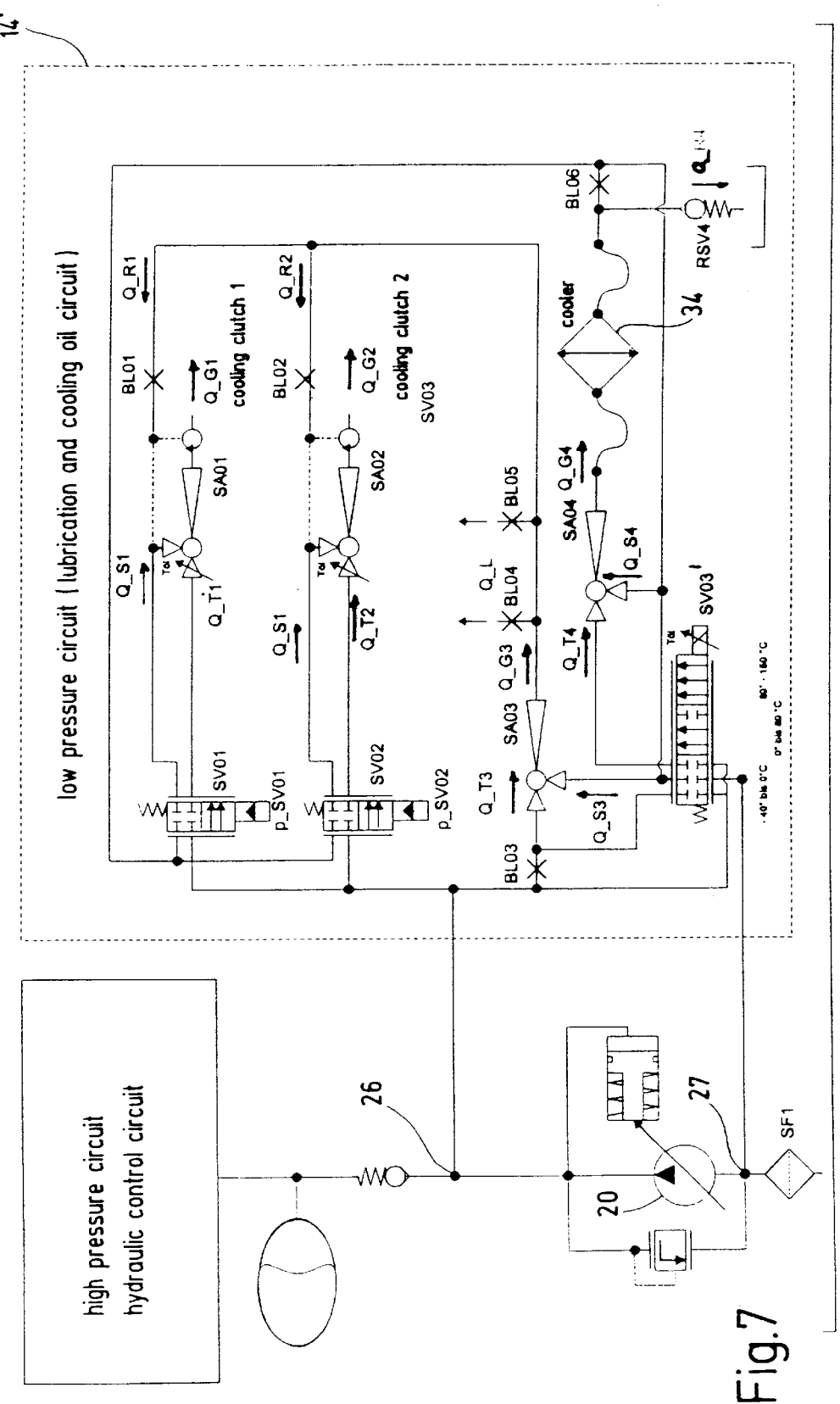
FIG. 7 is a diagram of an alternative embodiment of a low pressure circuit of the hydraulic circuit of FIG. 1.

FIG. 7 shows a diagram of a modification of a low pressure circuit 14'.

In general, the structure and function of the low pressure circuit 14' is identical to that of the low pressure circuit 14 of FIG. 2.

However, a single on-off valve SV03' replaces on-off valves SV03 and SV04, the single on-off valve SV03' being a 6/3-port directional control valve. The first switch position is used in cold operating conditions (e.g. from −40° C. to 0° C.), the second switching position is used in warm operating conditions (e.g. from 0° C. to 80° C.), and the third switching position is used in hot conditions (e.g. from 80° C. to 150° C.). If the operating temperature exceeds the range of hot temperatures, an alarm signal is created, independent from the on-off valve SV03'.

Two of the input side terminals of the on-off valve SV03' are connected with the output 26 of the adjustment pump 20. A central input is connected with the oil sump (the input of the adjustment pump 20).

Two output terminals of the on-off valve SV03' are connected with the driving jet side of jet pump SA03, and with the driving jet side of jet pump SA04, respectively. A third output terminal is connected in parallel with the suction jet sides of jet pumps SA03, SA04.

Further, the third output of the on-off valve SV03' is connected with the suction jet inputs of the on-off valves SV01 and SV02. It follows that no check valve RSV3 has to be provided, as in the embodiment of FIG. 2. The output of the cooler 34 is connected to the supply line leading from the on-off valve SV03' to the on-off valves SV01, SV02 via a restriction BL06.

The temperature for switching into the second operating condition of the on-off valve SV03' is determined by the suction limit of the most unfavorable jet pump. The jet pumps SA01 and SA02 are capable of sucking the cooled oil directly from the cooler 34 via restriction BL06.

The thermal controls of the on-off valves SV03, SV04 and SV03', respectively, can be implemented, for instance, with expansion elements or with bimetallic switches.

In general, it will be understood that the cooling oil at low oil temperatures, e.g. in the cold condition, can take up larger amounts of heat so that the cooling volume flows can be made smaller.

During the heat-up phase of the transmission, it is recommended to activate both cooling oil flows of the clutch intermediate switching processes.

Figure 8:
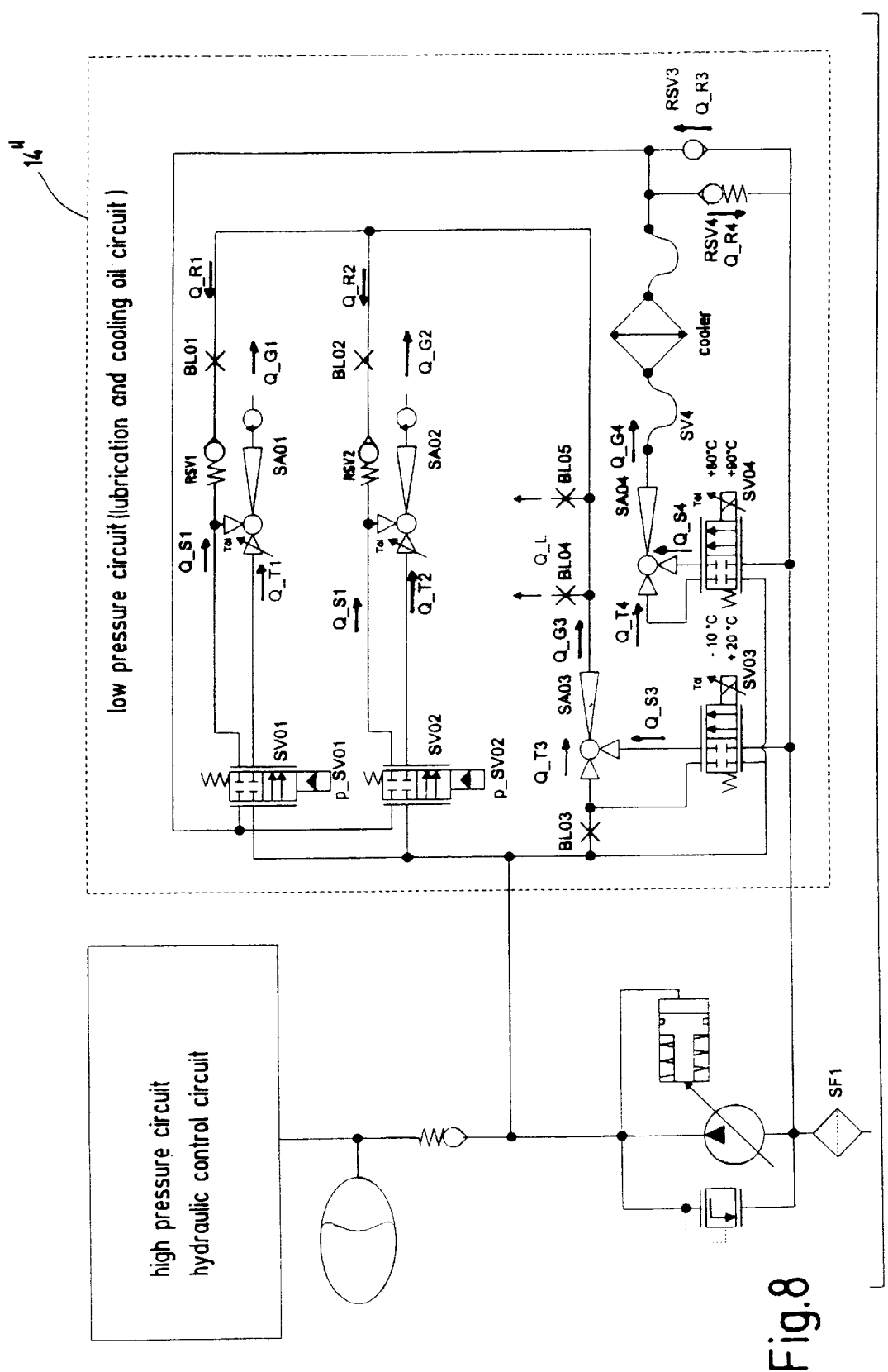
FIG. 8 is a diagram of another alternative embodiment of a low pressure circuit for the hydraulic circuit of FIG. 1.

FIG. 8 depicts another alternative embodiment of a low pressure circuit 14". The low pressure circuit 14" corresponds largely to the low pressure circuit 14 of FIG. 2. The output mixture volume flow Q_G3 from jet pump SA03 is distributed into a supply of the transmission (Q_L) and into volume flows Q_R1 and Q_R2, respectively, for the suction jet side terminals of the jet pumps SA01, SA02. Check valves RSV1 and RSV2 are coupled between the output of the jet pump SA03 and the suction jet sides of jet pumps SA01 and SA02, respectively. The check valves RSV1, RSV2 are spring-loaded.

The function corresponds to the function of the low pressure circuit 14 of FIG. 2.

Figure 9:
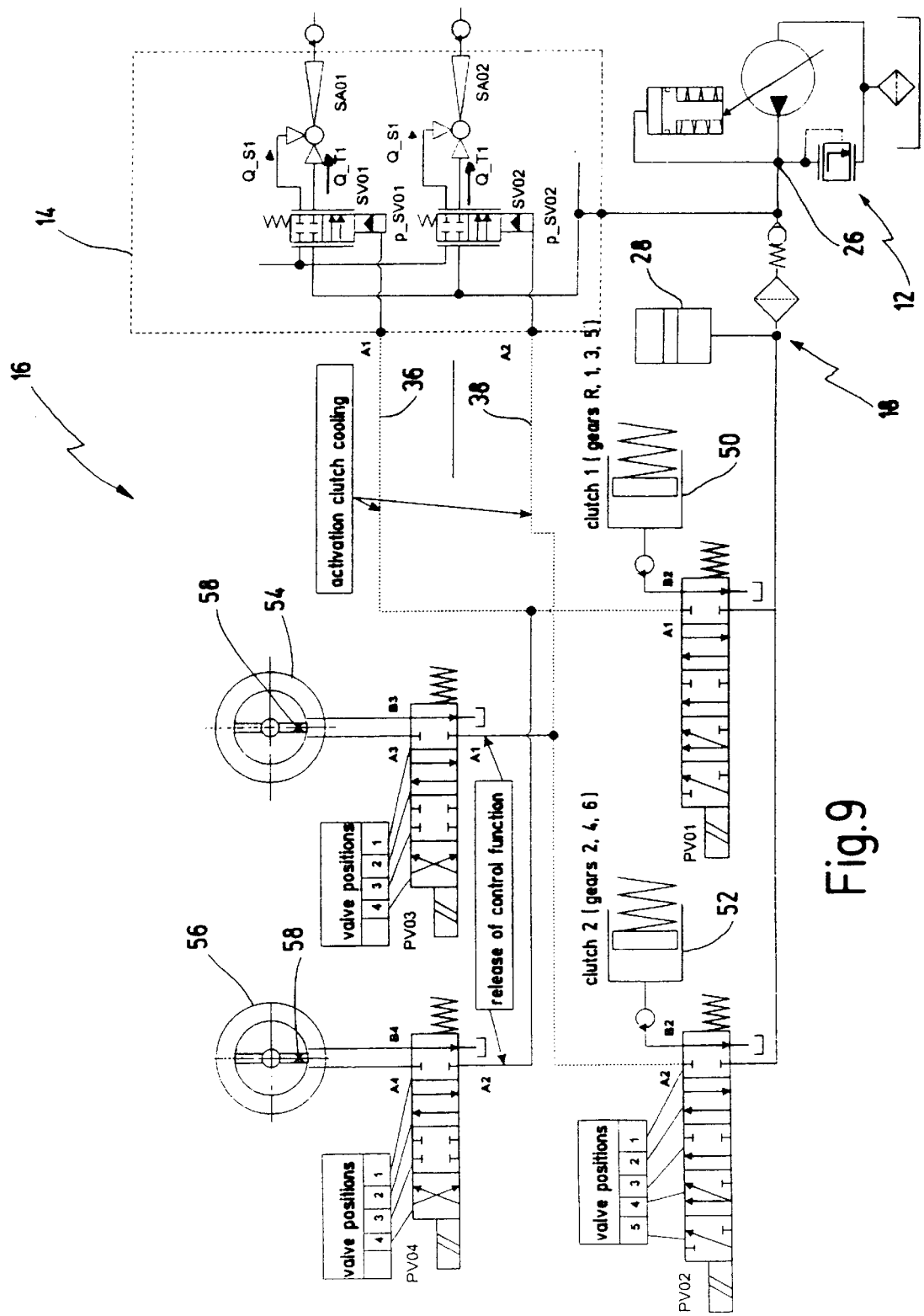
FIG. 9 is a diagram of an embodiment of the high pressure circuit of the hydraulic circuit of FIG. 1.

FIG. 9 depicts an embodiment of a high pressure circuit 16 of the hydraulic circuit 10 of FIG. 1.

The high pressure circuit 16 serves for driving two actuators 50, 52 for clutch 1 and clutch 2, respectively, as well as r two actuators 54 and 56 for gear shift clutches of the counter-shaft transmission.

The actuators 50, 52 are single-acting piston cylinder units. The clutch 1 driven by actuator 50 serves for engaging and disengaging gears 1, 3, 5 and the reverse gear. The clutch 2 driven via actuator 52 serves for engaging and disengaging gears 2, 4, and 6.

The actuators 54, 56 of the countershaft transmission are hydraulic rotational drives. The actuator 54 serves for shifting gears 1, 3, 5, and the reverse gear. Actuator 56 serves for shifting gears 2, 4, and 6.

The actuators 54, 56 are used for rotationally driving gear selector drums which are preferably single-track drums. When implementing such a drive concept, the gear steps of a clutch are collectively controllable. Double back shifts and triple back shifts can be made without intermediate synchronizing processes.

Triple shifts can be implemented as power shifts. Double shifts (skipping one gear, e.g. from 2 to 4) can be made as follows. During disengaging of the former (e.g. second) and engaging of the new (e.g. fourth) gear by means of actuator 56, wherein an interruption of the traction force occurs, another gear, e.g. gear 5, is intermediately for a short time engaged via the second branch by means of actuator 54. Thus, the traction force is supported during the shifting process from e.g. 2 to 4 (however, only with the torque of the fifth gear (or the sixth gear)).

The hydraulic actuators 54, 56 are advantageous over electric motor drives, as follows:

1. The mass is lower.
2. The dynamics are increased and the shifting periods are shortened.
3. The arrangement within the transmission is flexible.
4. The space occupied is smaller.

5. The electrical power consumption is low (e.g. a nominal current of 2 ampere at 12 volt in comparison to an electrical motor that demands 30 ampere at 12 volt), and 6. it is not necessary to provide a speed-increasing ratio.

A hydraulic drive unit consisting of a directional control valve and a hydraulic rotational drive has a mass of approximately 1000 g. A comparable electrical motor drive consisting of an electrical motor, a bearing bracket, a spur gear stage, and a gear selector drum has a mass of approximately 2500 g.

The control of the two clutch actuators 50, 52 is made by respective proportional 4/5-port directional control valves PV01 and PV02, respectively.

The inputs of the directional control valves PV01, PV02 are each connected to the energy storage section 18 and to the oil sump. First outputs B1, B2 are connected to the respective actuators 50 and 52. Second outputs A1, A2 serve to implement a side function. The second output terminal A1 of the directional control valve PV01 for main clutch 1 is coupled to the control line 36 for the on-off valve SV01 of the low pressure circuit 14. Correspondingly, the second control output A2 of the directional control valve PV02 is coupled to the control line 38 for the second on-off valve SV02 of the low pressure circuit 14.

Secondly, the second control outputs A1, A2 are directly coupled to respective inputs of two proportional 4/4-port directional control valves PV03, PV04 for driving the shift actuators 54 and 56, respectively, so as to release (or enable) same if required.

A second input of the two directional control valves PV03, PV04 is coupled to the oil sump. Outputs A3, B3, and A4, B4, respectively, of the valves PV03, PV04 are coupled to the respective actuators 54 and 56. The actuators 54, 56 are each provided with a restriction 58.

Figures 10, 11:
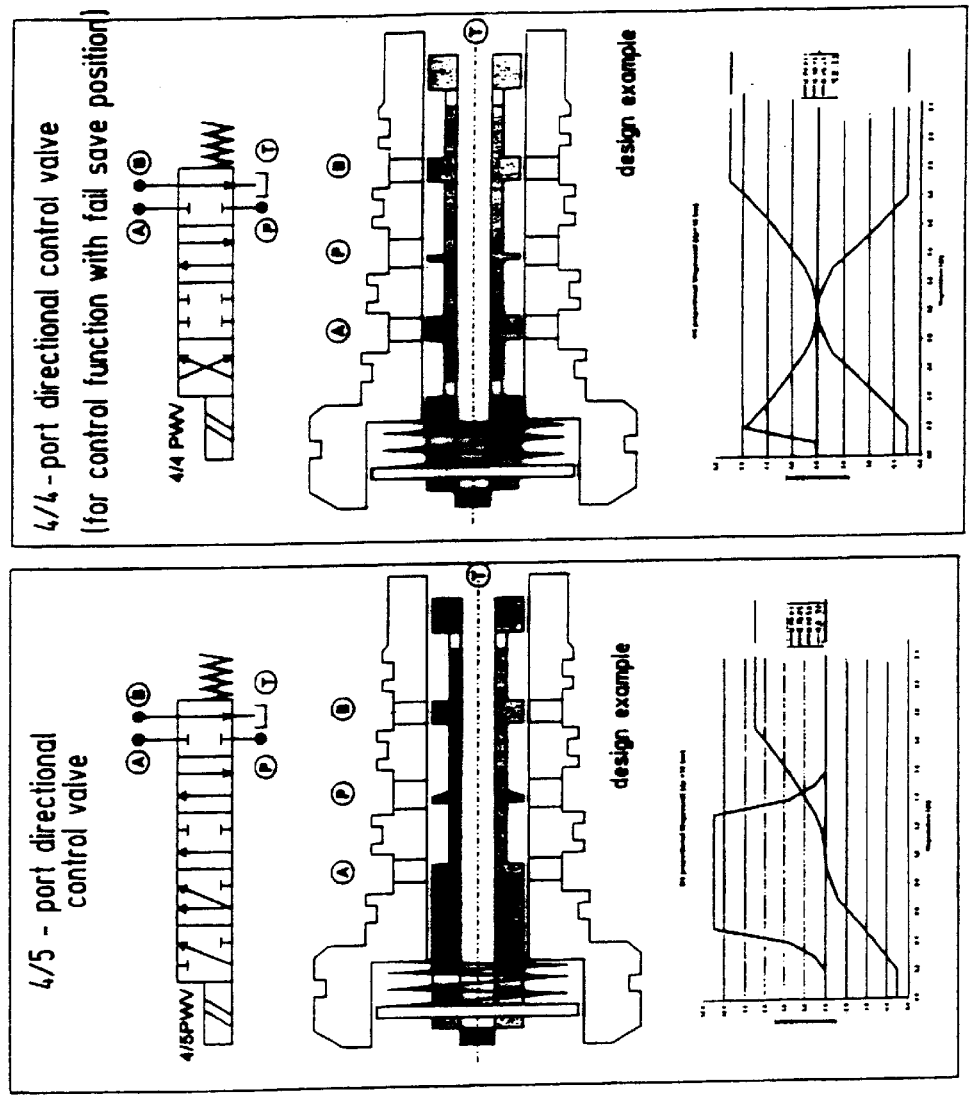
FIG. 10 is a schematic illustration of a 4/5-port directional control valve for clutch control in the high pressure circuit of FIG. 9.
FIG. 11 is a schematic illustration of a 4/4-port directional control valve for the shift actuators of the high pressure circuit of FIG. 9.

The construction of the 4/5-port directional control valves PV01, PV02 is shown in FIG. 10. The construction of the proportional 4/4-port valves PV03, PV04 is shown in FIG. 11.

Figure 12:
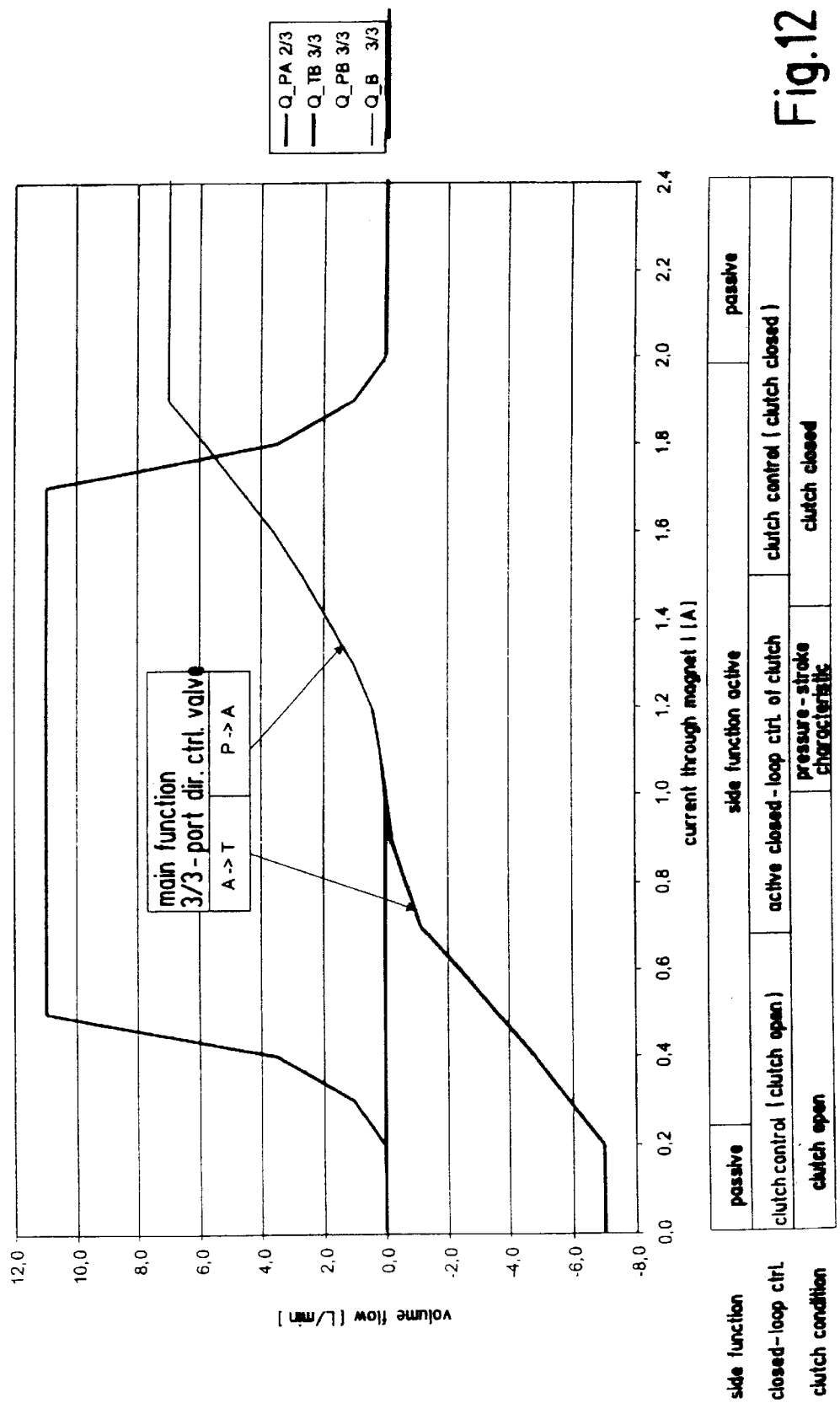
FIG. 12 is a diagram of the volume flow versus the magnetic current of the 4/5-port directional control valve of FIG. 10, including a side function.

FIG. 12 depicts a characteristic of the 4/5-port directional valve (the valves PV01, PV02) as the volume flow versus the magnetic current (which is proportional to the stroke). It can be seen that the connected main clutch is open in a range from 0 to 1 ampere and will be closed in a range from approximately 1.4 ampere to 2.4 ampere.

In the range between 1.0 ampere and 1.4 ampere, a particular pressure stroke characteristic is provided by means of which the slip condition of the main clutch can be controlled for purposes of starting the vehicle and of conducting gear shifts.

In general, the main clutch control is active in the range between approximately 0.7 ampere to approximately 1.5 ampere. The control of the condition of the respective main clutch is made using the central three positions of the proportional 4/5-port directional valve which is driven by a solenoid. For establishing a symmetrical side function, two further positions are provided, which are arranged at the respective opposite ends of the 4/5-port directional valve. In an initial position into which the valve is biased by means of a spring, the main clutch is open because the control output B is connected with the oil sump. The side function (control output A) is passive. This condition is achieved in a range between 0 to 0.25 ampere.

In the other end position, the side function which is realized by control output A is also passive; however, the main clutch is closed because the control output B is coupled to the energy storage section 18. This condition is achieved in a range of magnetic current from approximately 2 to 2.4 ampere.

In the range from 0.25 ampere to 2 ampere, the side function is active, wherein the control output A is also coupled with the energy storage section 18. In this condition, the associated main clutch is cooled, which cooling process is controlled via lines 36 and 38, respectively. Further, the shifting function of the two actuators 54, 56 is released when the side function is active.

In other words, control terminal A is locked in the end positions of the valve and is coupled to the pressure terminal P in a central stroke range only. The active range of the characteristic P→A is to be understood as the manipulating range which is used by the main clutch valve for closed-loop control of the main clutch pressures.

The grouping of the active ranges ensures that the side function is permanently active within the closed-loop control of the primary function. Within the controllable range of the primary function, the side function can be active or passive. An activation of the side function can be made by establishing a predetermined magnetic current, starting from the rest condition of the clutches. The changes of the primary function are small in the passive range of the side function. Activation of the cooling of the main clutches can be realized by the side function, without providing any additional cooling oil valves. Further, the manipulating drives for operating the synchronizing units can be locked, released and/or selected by means of the side function.

The function of the shift valves PV03 and PV04 can be described as follows. The general shape of the characteristic of volume flow with respect to magnetic current can be taken from the diagram of FIG. 11. At low volume flows, the 4/4-port directional control valve is generally inactive, due to the spring bias. The other three positions of the shift valves are assigned to an active range. In the active range, a central position serves for maintaining the actual pressure condition of the actuators 54 and 56, respectively. The other two positions of the active range serve to move or operate the actuator in the one or the other direction.

Thus, the actuator functions can be realized by a very small number of manipulating drives.

A manipulating drive serves to closed-loop control the position and to proportion the force. Namely, the shifting processes should be made fast, precise, with low noise emission and with gentle treatment of the synchronizer units. Although the number of drives should be limited to a minimum, a high flexibility should be provided as to the numbers of admissible gear shifts. The function of the high pressure circuit 16 during a gear shift from the first gear into the second gear, to take an example, is as follows. In the first gear, the main clutch 1 is closed, and the side function is inactive so that the actuator 56 for gears 2, 4, and 6 is not released. The directional control valve PV01 is in the utmost left position, as shown in FIG. 9.

On the other hand, the directional control valve PV02 is in the utmost right position. The main clutch 2 is opened and the side function is inactive. Thus, actuator 54 for gears 1, 3, and 5 is not released.

In order to initiate a gear shift into the second gear, the directional control valve PV01 is moved into the adjacent valve position so that the side function (control output A1) is activated. Thus, actuator 56 is released. The second gear is engaged by suitably activating valve PV04.

In the following, the main clutch 1 is opened and the main clutch 2 is closed in an interleaving manner, using the respective pressure stroke characteristics. This gear shift can be a power gear shift. It is to be understood that during the whole time of the gear shift, the active side function serves to cool main clutch 1, and, during the interleaving operation, both main clutches 1 and 2.

At the end of the gear shift, the second gear is engaged, clutch 2 is closed and clutch 1 is open.

Figure 13:
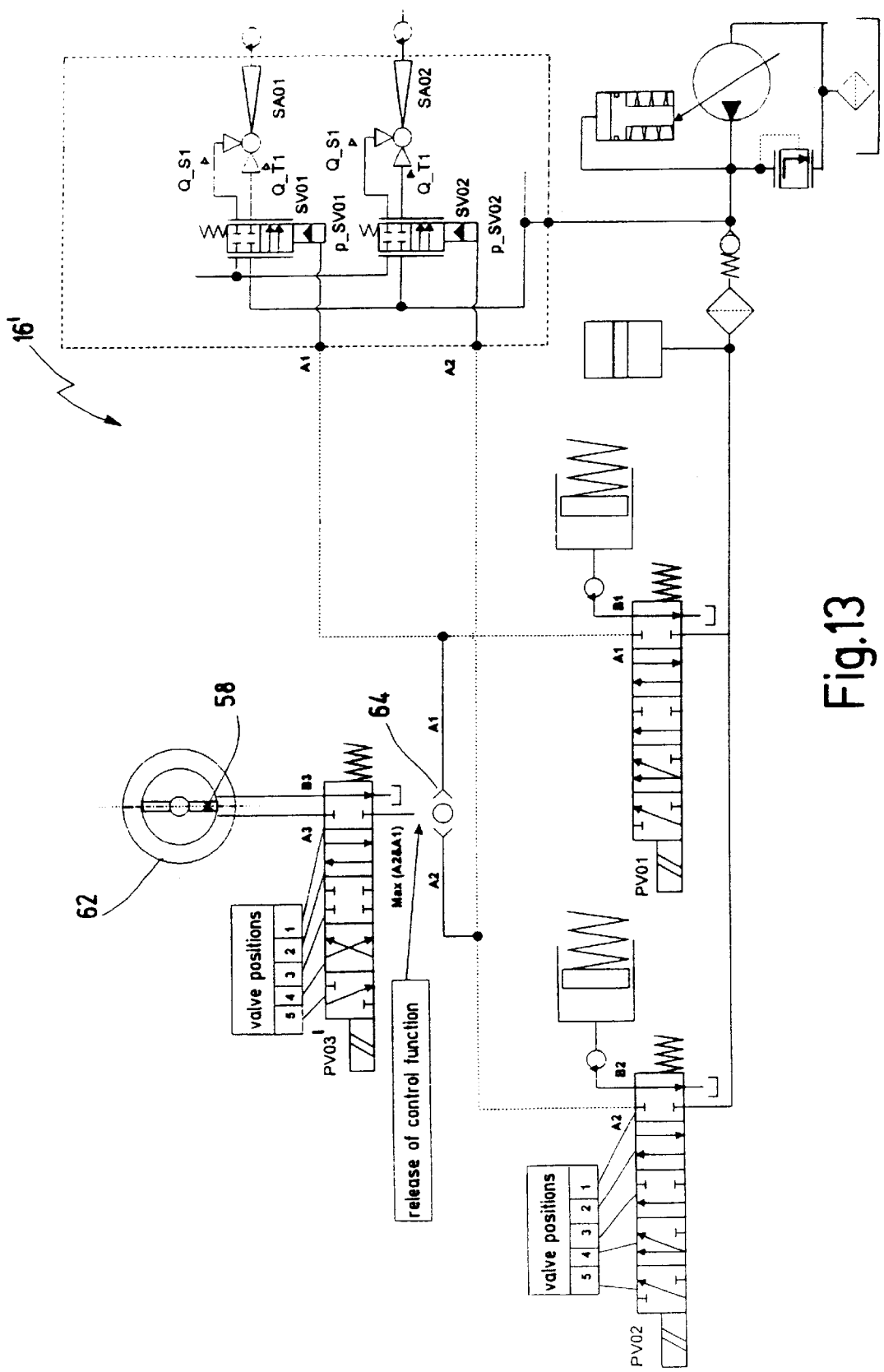
FIG. 13 is a diagram of an alternative embodiment of a high pressure circuit of the hydraulic circuit of FIG. 1, wherein a single gear selector drum is provided as a shift actuator.

FIG. 13 depicts an alternative embodiment of a high pressure circuit 16'.

The actuators for main clutches 1 and 2 are identical to the high pressure circuit 16. However, only one single shift actuator 62 is provided for the transmission, which drives a single gear selector drum. Thus, the number of degrees of freedom is reduced with respect to the embodiment of FIG. 9. The gear selector drum allows to mechanically couple the synchronizer units and to lock same with respect to each other. The flexibility is reduced.

On the other hand, only one single proportional magnetically controlled 4/5-port directionally control valve PV03' is necessary for driving the actuator 62. A logical change-over valve 64 serves to release the shift function via control outputs A1, A2 of directional control valves PV01, PV02. Thus, the shifting function is generally released as soon as the side function of one of the two directional control valves PV01, PV02 is active.

It is to be understood that double downshifts or triple downshifts have to be made sequentially as the associated gear selector drum serves all six forward gears as well as the reverse gear in a successive manner.

Figure 14:
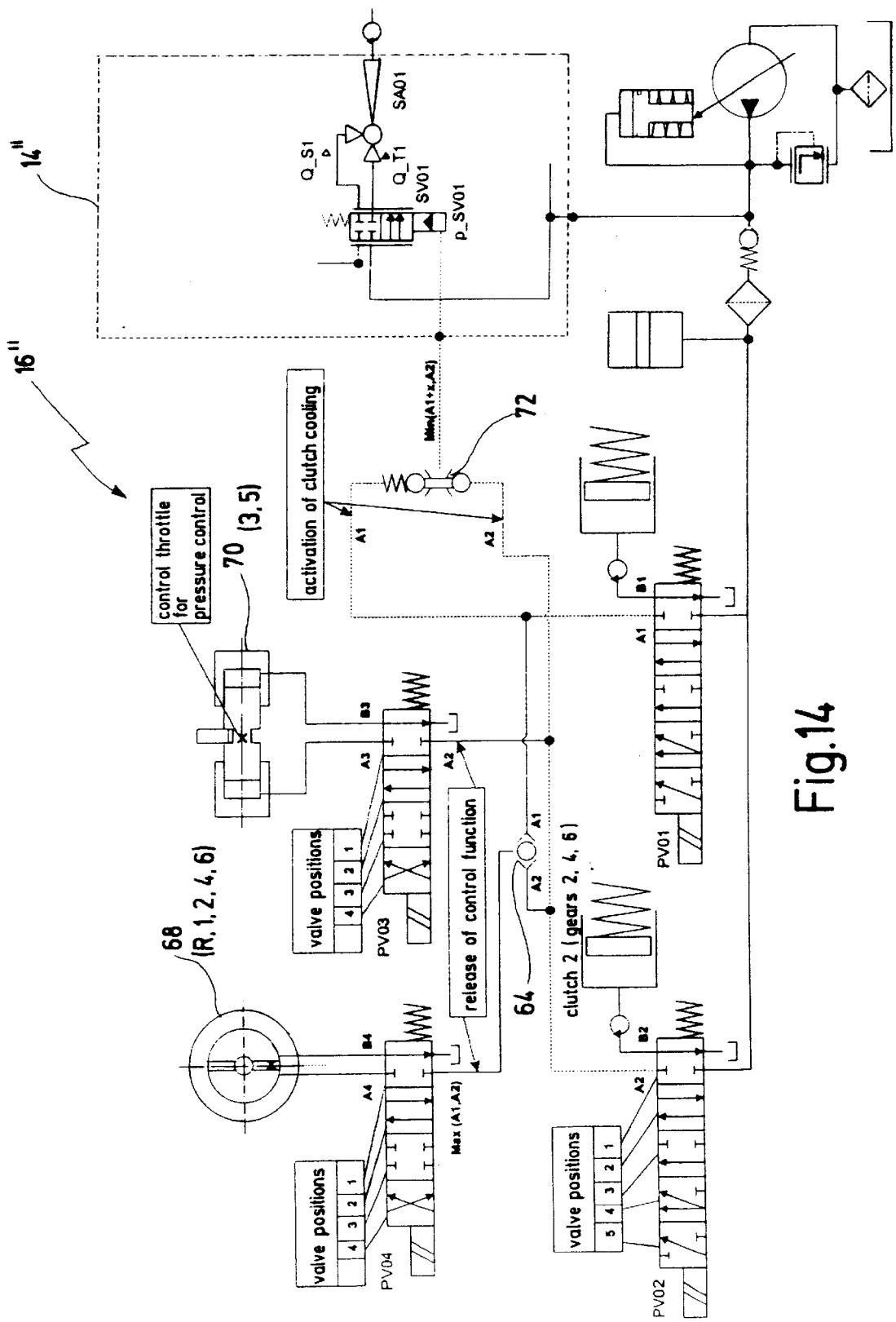
FIG. 14 is a diagram of another alternative embodiment of a high pressure circuit, wherein a gear selector drum and a cylinder are provided as transmission actuators.

FIG. 14 depicts another embodiment, wherein one actuator 68 is provided for gears R, 1, 2, 4, and 6. The actuator 68 is a hydraulic rotational drive and serves to drive a gear selector drum which is assigned to these gears.

A hydraulic cylinder drive is provided for gears 3 and 5. This provides that gears 3 and 5 are served by one single synchronizer unit.

The cylinder drive 70 is easier to manufacture, compared with a rotational drive. However, this combination of manipulating drives for the transmission does not allow for a direct gear-shift from the fourth into the first gear.

For each of the hydraulic rotational drive 68 and for the hydraulic cylinder drive 70, a proportional magnetically controlled 4/4-port directional control valve PV03 and PV04 is provided. The function of those valves corresponds to that of the valves of FIG. 9.

The control valves PV01, PV02 are identical to the embodiment of FIG. 9. Main clutch 1 is assigned to gears R, 1, 3, 5; main clutch 2 to gears 2, 4, 6.

Release of the shifting function of actuator 68 is made via a logical change-over valve 64. The actuator 70 is directly released via control output A2 of valve PV02.

In contrast to the previous embodiments, the present embodiment comprises in the low pressure circuit 14" only one single jet pump SA01 with corresponding on-off valve SV01 for clutch cooling.

Activation of the clutch cooling is made via a logical reducer valve 72 to which the control outputs A1 and A2 of on-off valves PV01, PV02 are coupled.

The lower pressure of the two pressures of control outputs A1 and A2 is switched to on-off valve SV01. A spring may be provided for positioning the valve to one of the two end positions in case of balanced pressures A1, A2. In other words, the cooling of the two clutches is active only in case of activation of both side functions (control terminals A1, A2).

The control of the shift actuators 68, 70 is not related thereto and can be made by activating the side function with passive clutch cooling.

In the embodiment of FIG. 14, the condition that during active clutch cooling a gearshift associated to that clutch must not be made, makes necessary the introduction of the logical change-over valve 64. The valve 64 allows a gear-shift R and 1 by activating the side function of the valve PV02, and a gear-shift to 2, 4, and 6 via valve PV01.

The clutch valves PV01, PV02 closed-loop control the pressure in the manipulating cylinder of the respective main clutches and control the cooling and the logical functions within the transmission. The clutch valves PV01, PV02 release the shift actuator for the gears of the respective other clutch as well as the system pressure. The effect of drag power during active clutch cooling extends the process of making identical the rotational speeds in a synchronizer unit during shift processes. Thus, the control of the clutch cooling and the shift actuator are made asymmetrical.

Figure 15:
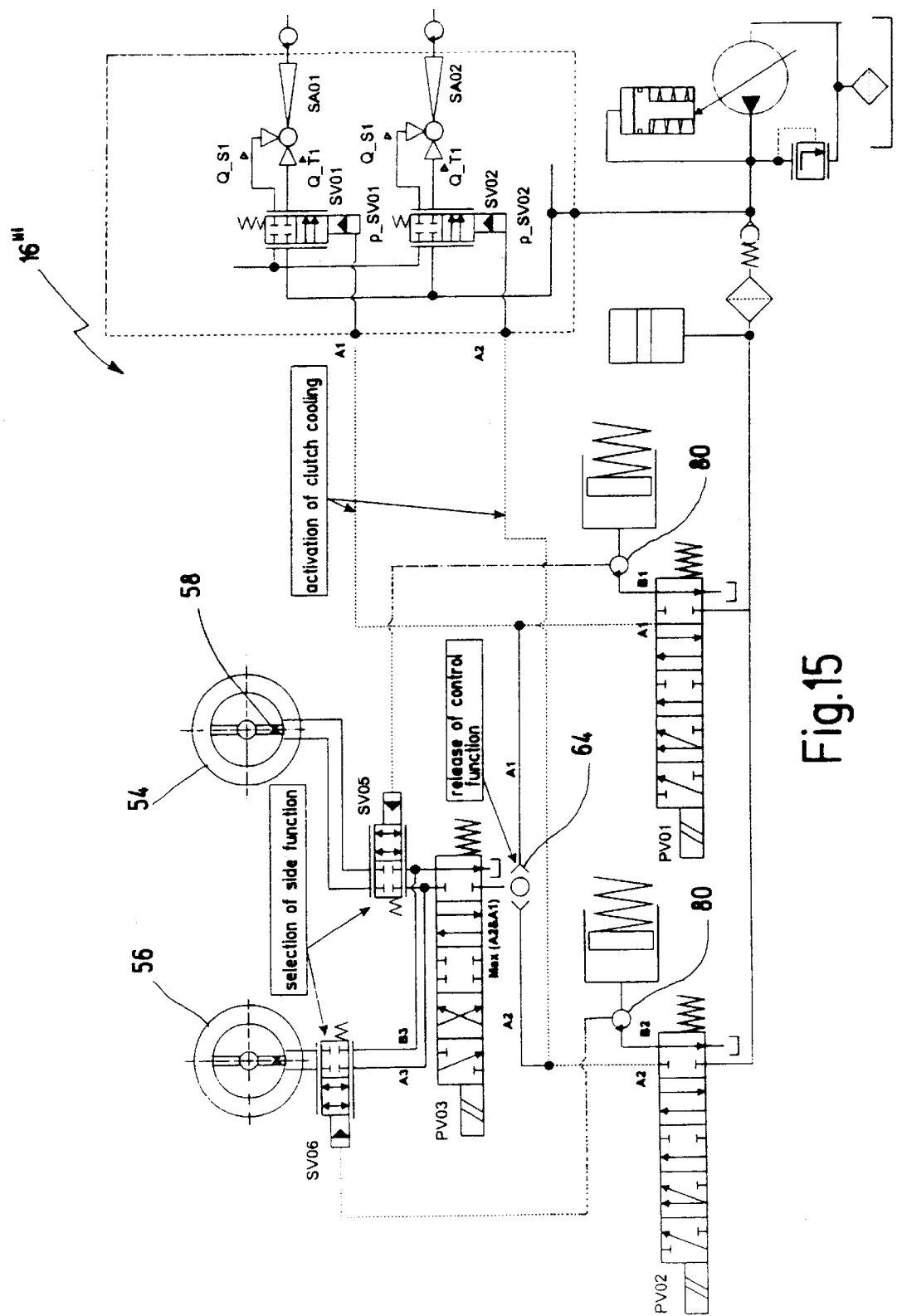
FIG. 15 is a diagram of another alternative embodiment of a high pressure circuit, wherein on-off valves are coupled between the control valves and the transmission actuators for release purposes, and wherein only one directional control valve is provided for driving the two transmission actuators.

FIG. 15 depicts another alternative embodiment which is similar to the embodiment of FIG. 9.

The two actuators 54, 56 for the shift function are controlled by means of a single 4/5-port directional control valve PV03'. Release of the respective actuators 54, 56 is made by additional on-off valves SV05, SV06 which are coupled between the directional control valve PV03' and the actuator 54, and between the valve PV03' and the actuator 56, respectively. The activation of the on-off valves SV05, SV06 is made via respective control members or control tabs 80 which are coupled between the main clutches 1, 2 and the control outputs B1 and B2 of the directional control valves PV01, PV02, respectively.

Thus, the on-off valves SV05 and SV06 are active in their initial position.

For example, on-off valve SV05 is closed, and the actuator 54 for gears 2, 4, and 6 is locked, if the clutch pressure of main clutch 1 (for gears R, 1, 3, 5) reaches a predetermined value, wherein the clutch 1 is, for example, closed.

In general, the release of the shift function is made by a combination of control outputs A1 and A2 via a logical change-over valve 64 which transmits the higher pressure of the two pressures A1, A2 to the control valve PV03'.

Figure 16:
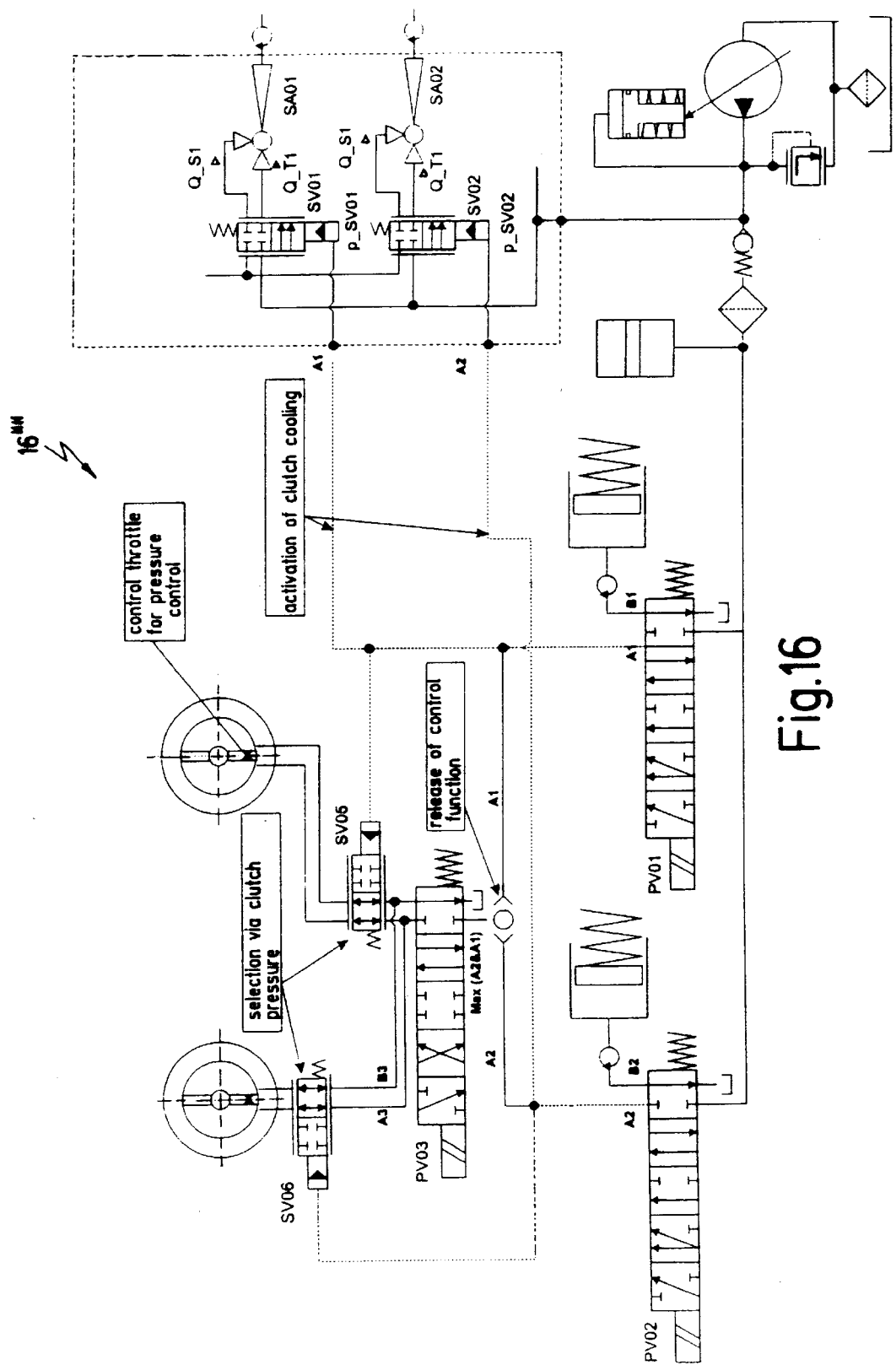
FIG. 16 is a diagram similar to FIG. 15, wherein the intermediate on-off valves are controlled in a different manner.

FIG. 16 depicts an alternative embodiment of a high pressure circuit 16"". The general construction and the elements used are identical to the high pressure circuit 16''' of FIG. 15.

However, the on-off valves SV05, SV06 are driven by means of the side function of the control valves PV01, PV02, and not by means of the clutch pressure.

Figure 17:
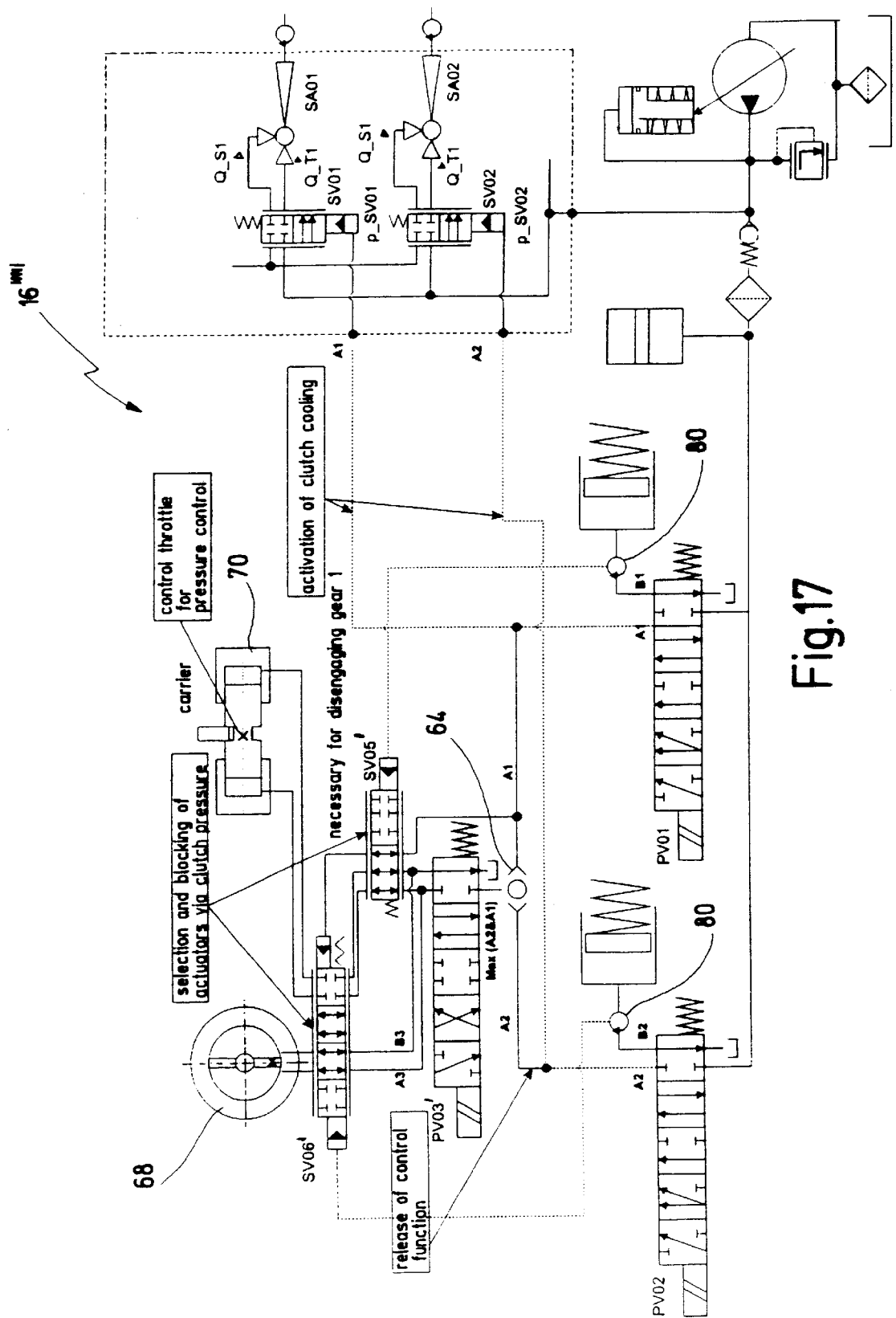
FIG. 17 is a diagram of a modification of the embodiment of FIG. 14, including only a single directional control valve for driving the transmission actuators.

FIG. 17 depicts another alternative embodiment of a high pressure circuit 16""'.

This embodiment is based on the embodiment 16" of FIG. 14, wherein an actuator 68 is provided for gears R, 1, 2, 4, 6, and wherein a cylinder drive 70 is provided for gears 3 and 5.

As before, the actuators 68, 70 are driven in this embodiment by a single proportional magnetically controlled 4/5-port directional control valve PV03' (similar to the embodiments of FIGS. 15 and 16).

In order to select or lock the actuators 68 and 70 by means of the clutch pressure (elements 80), two on-off valves SV05' and SV06' are provided. The on-off valve SV05' is a 6/2-port directional control valve and is open in its passive condition. Two of the outputs of the on-off valve SV05' are passed to two inputs of the on-off valve SV06'. Another output serves as a control input for the on-off valve SV06', supporting the spring bias of this on-off valve.

The on-off valve SV06' is an 8/2-port directional control valve and allows alternatively to release of the actuator 68 (as shown in FIG. 17), or release of the actuator 70. A release of the actuator 70 is made via a control output which is based on the clutch pressure of main clutch 2 for gears 2, 4, and 6.

The release of the shifting function is made again by means of a logical change-over valve 64.

Figure 18:
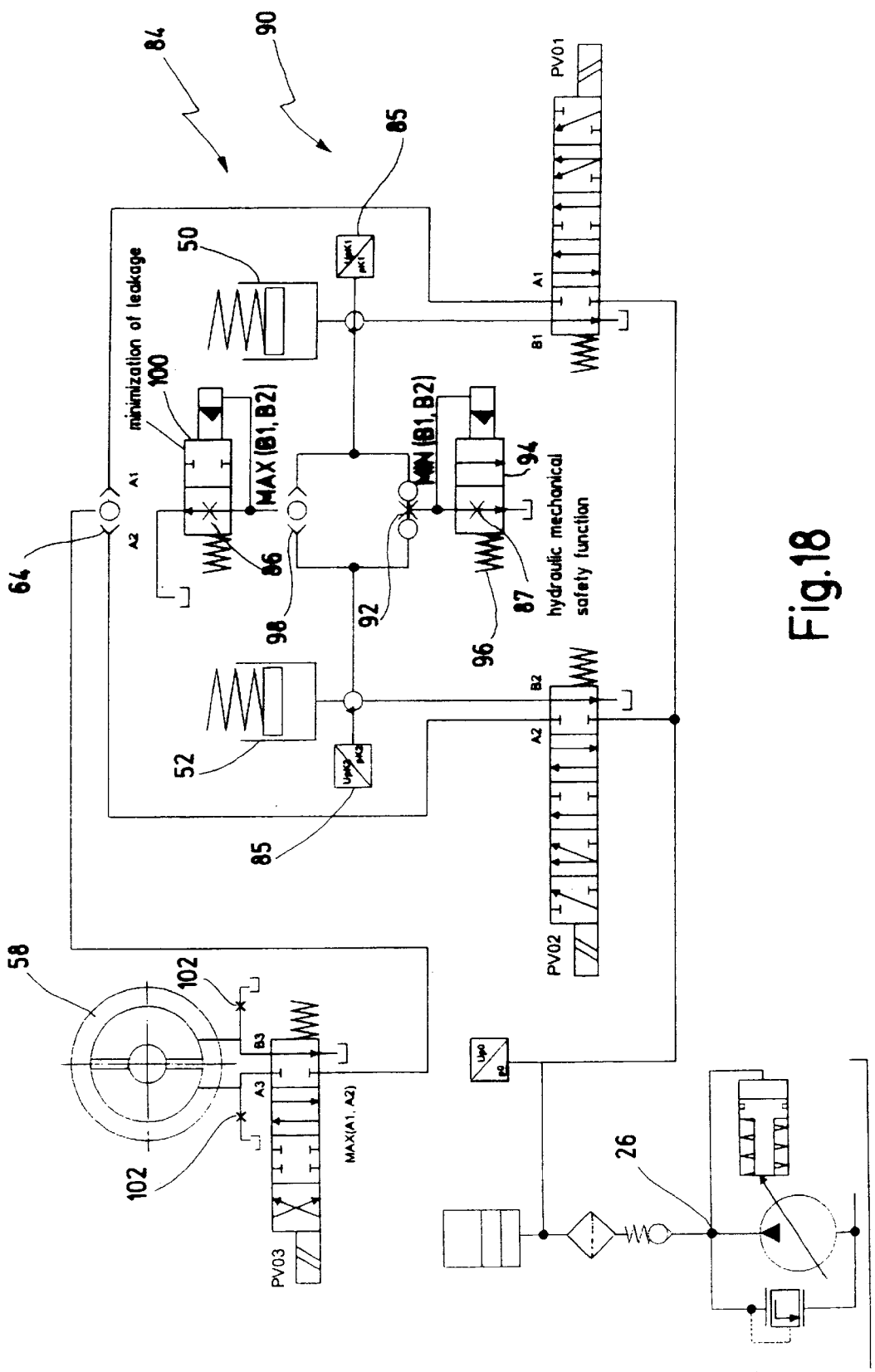
FIG. 18 is a diagram of another embodiment of a high pressure circuit of the hydraulic circuit of FIG. 1, including a safety circuit for preventing transmission blockage, and including a safety circuit for a pressure sensor.

FIG. 18 depicts a hydraulic safety device 90 which is combined with the high pressure circuit 16' of FIG. 13.

The safety device 90 serves to prevent that the actuators 50, 52 simultaneously and completely close the two main clutches 1, 2. Thus, transmission blockages can be prevented.

To this purpose, the clutch pressures which are fed via control outputs B1 and B2 to clutch actuators 50, 52, are compared in a logical reducer valve 92. The smaller pressure of the two pressures is passed to a spring-biased safety directional control valve 94. The valve 94 is biased by a spring 96, corresponding to a predetermined pressure of e.g. 7.5 bar. In this case, a pressure of 10 bar would correspond to a complete closure of a clutch.

If the smaller pressure of the two clutch pressures exceeds a value of, for instance, 7.5 bar against the force of the spring 96, the valve 94 switches hydraulically via the associated control terminal and connects the input directly to the oil sump. Conclusively, if both clutches would have a pressure of more than 7.5 bar in this embodiment, the clutch with the lower pressure would be directly coupled to the oil sump and would conclusively be opened. Thus, it can be prevented that both clutches are actuated simultaneously to a full extent. It is not possible that the transmission is blocked.

In an initial condition, the input of the valve 94 is coupled via a very small restriction 87 (e.g. with a diameter of 1 mm) to the oil sump.

In addition, the two clutch pressures are compared in a logical change-over valve 98. The higher pressure of the two clutch pressures is passed to the input of another valve 100, the construction of which completely corresponds to that of valve 94. Also, a restriction 86 with a diameter of 1 mm is provided for the passive condition.

The logical change-over valve 98, the further valve 100 and the restrictions 86, 87 are forming another safety device 84. The safety device 84 serves to monitor the function of two pressure sensors 85 for the clutch pressure for the actuators 50 and 52, respectively, and to replace same if necessary.

In view of the fact that a branch with a restriction 86 and 87 is established parallel to the branch from control output B1 (or B2) of the directional control valve PV01 (or PV02) to the actuator 50 (or 52), a characteristic of pressure in the line (corresponding to the pressure measured by the sensors 85) versus a manipulating value of the valve PV01 (or PV02) is established. The manipulating value is, for instance, the magnetical current or the stroke.

Thereby, in case of a failure of a pressure sensor 85, an emergency function can be established by suitable control, taking into consideration the established characteristic, wherein the clutch pressures are controlled by modulating the valves PV01, PV02. On the other hand, the safety device 84 allows to evaluate the function of the pressure sensors 85 on a regular basis, as to whether the functions are plausible.

It is to be understood that the restrictions 86, 87 are usually only active and, thus, increase the control oil current, if the valves 94, 100 are switched to transfer state. This is the case if at least one of the main clutches is actively closed-loop controlled (via terminals B1, B2). Thus, the restrictions 86, 87 are activated only if required; losses do not occur if a clutch is fully closed.

FIG. 18 depicts another function wherein the control oil for the actuator 58 can be used via respective restrictions 102 as cooling oil for synchronizer elements.

Figure 19:
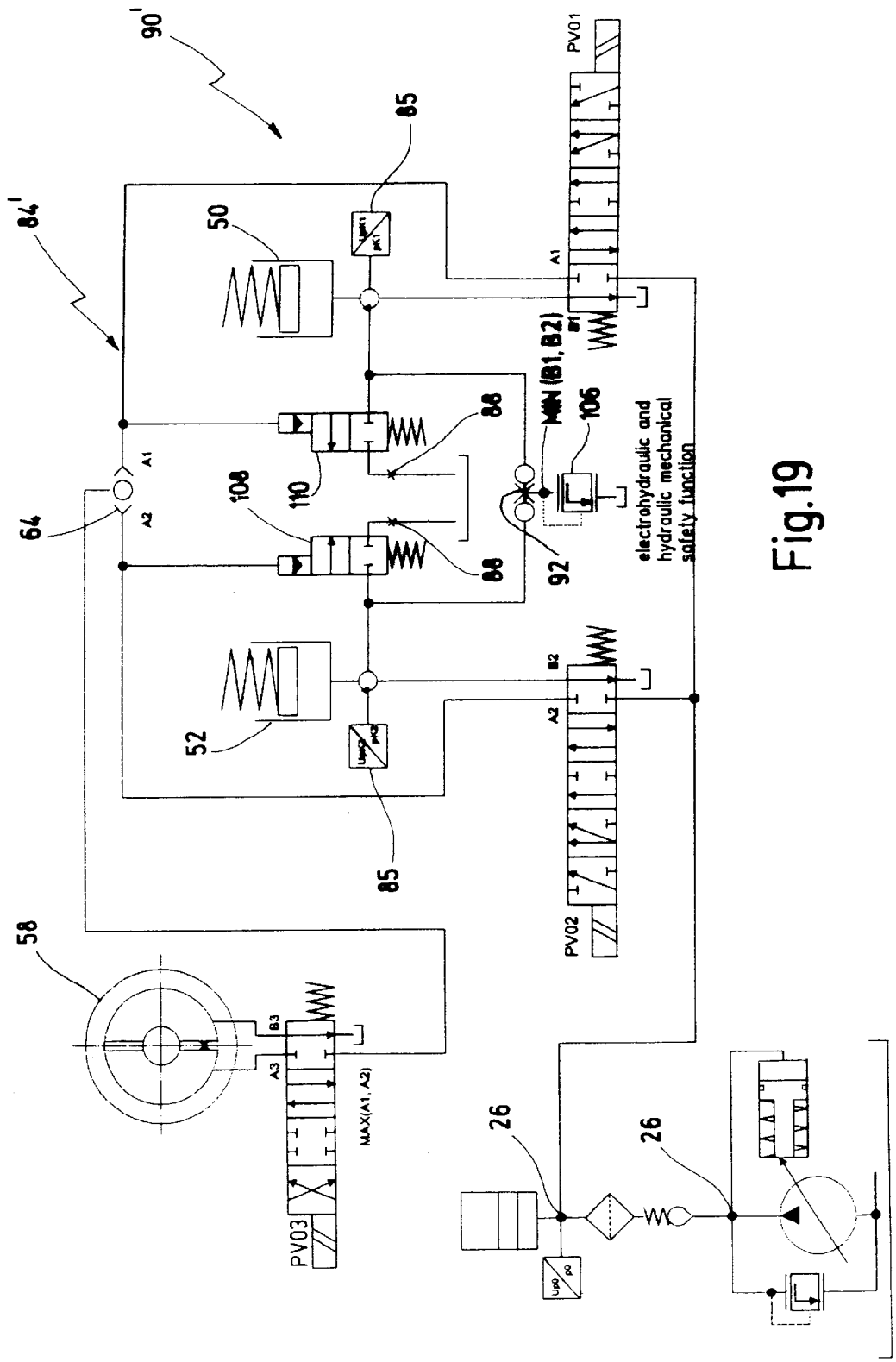
FIG. 19 is a diagram of a modification of the high pressure circuit shown in FIG. 18.

FIG. 19 depicts an alternative safety device 90' and an alternative further safety device 84'.

The safety device 90' comprises the logical reducer valve 92, the output of which being connected to a safety pressure valve 106. The safety pressure valve 106 is designed such that it opens at a certain control pressure (e.g. 7.5 bar) to the oil sump. Thus, the function is identical to the safety directional control valve 94 of FIG. 18.

The safety device 90', further, comprises two hydraulically controlled 2/2-port directional control valves 108, 110 which are coupled to the respective control terminals A1, A2 of the clutch valves PV01 and PV02, respectively.

As soon as the side function of the respective clutch is activated via the respective control output A1 or A2, the associated directional control valve 108 (or 110) opens to a line which leads via a restriction 88 (as above with a diameter of e.g. 1 mm) to the oil sump. In this embodiment, this control oil can be used as cooling oil for the respective clutch. Otherwise, the function of this embodiment is identical to that of the safety device 90 of FIG. 18.

Figure 20:
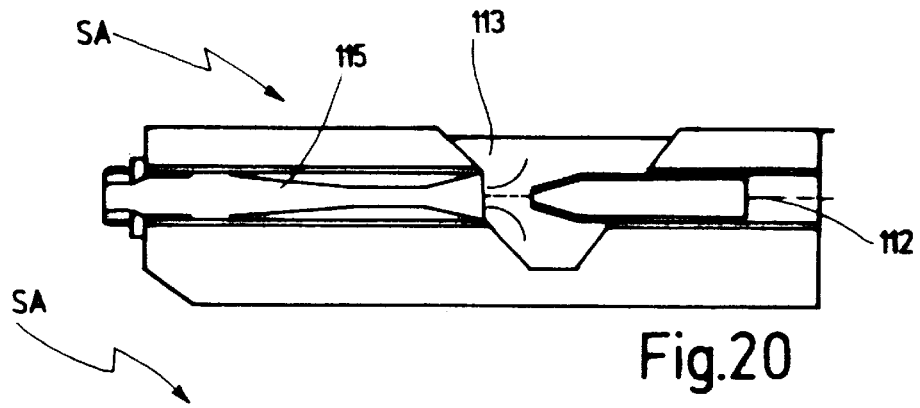
FIG. 20 is an exemplary side view of a realization of a jet pump.
Figure 21:
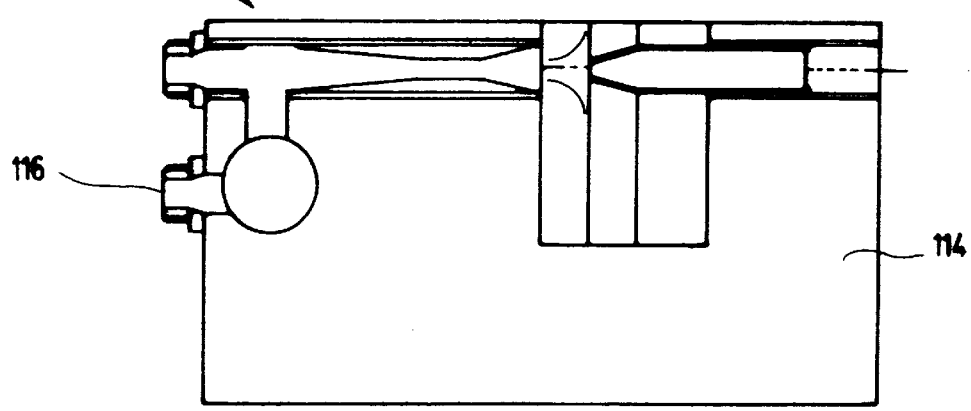
FIG. 21 is a top view of the jet pump of FIG. 20.

FIGS. 20 and 21 are a schematical top view and a schematical side view of an embodiment of a jet pump SA.

The general function of such jet pumps is well known. In the present case, a driving nozzle 112 is made adjustable in axial direction by means of a thread. A suction nozzle 113 is provided as a recess in a main body 114. The driving nozzle 112 projects into the recess 113.

The mixture nozzle and the diffuser are provided as one further element 115 which can be placed into the main body 114 by means of a further thread.

Further, FIG. 21 shows that the output of the jet pump SA can be coupled to a further line 116.

Figure 22:
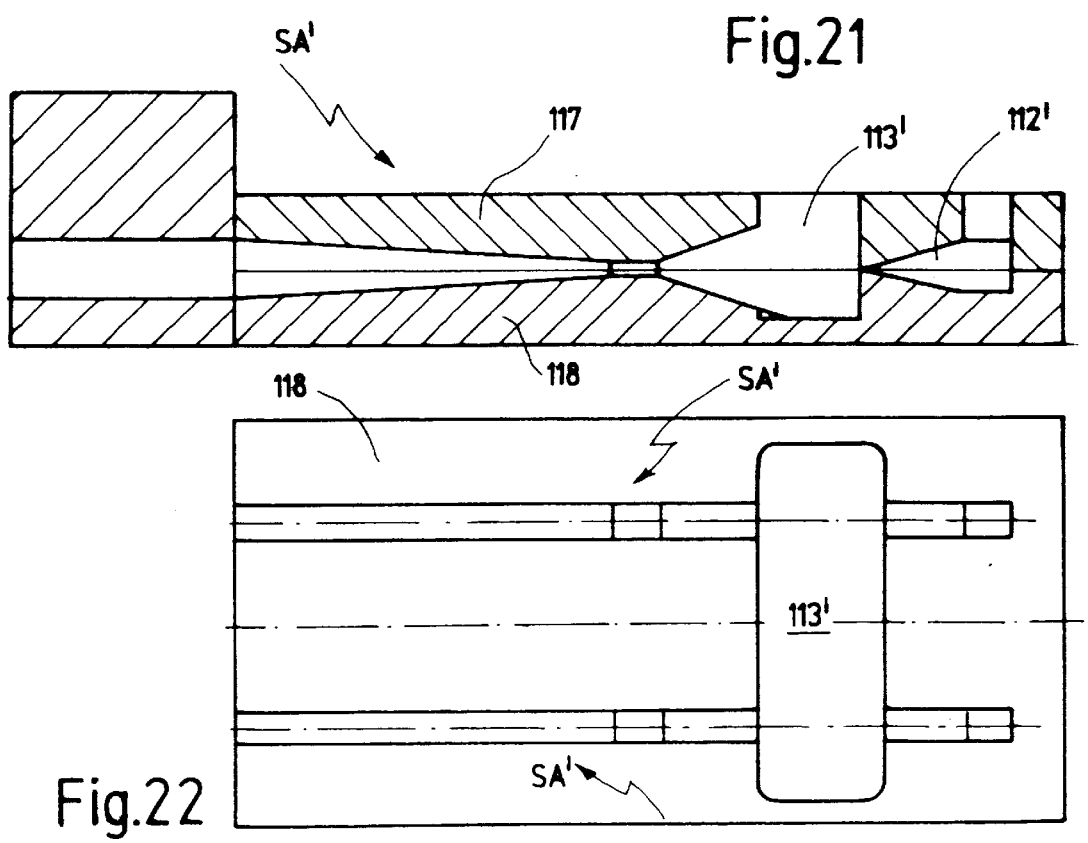
FIG. 22 is a schematic illustration of a realization of a jet pump, using opposite parts of a transmission housing and a valve plate.

FIG. 22 is a schematic view of a jet pump SA', wherein one axial half is formed by a transmission housing 117, and the other half by a valve plate 118.

In the top view shown in FIG. 22, it can be seen that two jet pumps SA' are provided in an arrangement side by side, wherein those two jet pumps SA' share a recess for the suction nozzle 113'.

What is claimed is:

1. A hydraulic circuit, for an automated twin clutch transmission for motor vehicles, the transmission comprising a countershaft transmission and at least one main clutch, the hydraulic circuit comprising:

a high pressure circuit having at least one actuator for at least one of the countershaft transmission and the clutch;

a first adjustment pump having an output for providing a variable high pressure for the high pressure circuit; and a low pressure circuit for lubrication and cooling of the automated twin clutch transmission wherein the low pressure circuit comprises a plurality of second pumps providing an output volume flow for lubrication and cooling, wherein the second pumps are connected in series to the output of the first adjustment pump and wherein the second pumps comprise jet pumps, driving jet sides thereof being connected to the output of the first adjustment pump and wherein outputs of the second pumps are in fluid communication with an input of the first adjustment pump.

2. The hydraulic circuit of claim 1, wherein the high pressure circuit comprises said actuator and a proportional directional control valve for the clutch.

3. The hydraulic circuit of claim 2, wherein the high pressure circuit comprises said actuator and proportional directional control valve for each of a plurality of main clutches.

4. The hydraulic circuit of claim 1, wherein at least two of the plurality of second pumps are arranged parallel to each other.

5. The hydraulic circuit of claim 1, further comprising a tank into which the output volume flow of the second pumps flows and from which the input of the input of the first adjustment pump draws.

6. A hydraulic circuit, for an automated twin clutch transmission for motor vehicles, the transmission comprising a countershaft transmission and at least one main clutch, the hydraulic circuit comprising:
   a high pressure circuit having at least one actuator for at least one of the countershaft transmission and the clutch;
   a first adjustment pump having an output for providing a variable high pressure for the high pressure circuit; and
   a low pressure circuit for lubrication and cooling of the automated twin clutch transmission wherein the low pressure circuit comprises a plurality of second pumps providing an output volume flow for lubrication and cooling, wherein the second pumps are connected in series to tie output of the first adjustment pump and wherein the second pumps comprise jet pump, driving jet sides thereof being connected to the output of the first adjustment pump an wherein at least two of the plurality of second pumps are arranged parallel to each other.

7. The hydraulic circuit of claim 6, wherein the high pressure circuit comprises said actuator and a proportional directional control valve for the clutch.

8. The hydraulic circuit of claim 7, wherein the high pressure circuit comprises said actuator and proportional directional control valve for each of a plurality of main clutches.

9. The hydraulic circuit of claim 6, wherein outputs of the second pumps are in fluid communication with an input of the first adjustment pump.

10. The hydraulic circuit of claim 9, further comprising a tank into which the output volume flow of the second pumps flows and from which the input of the input of the first adjustment pump draws.

* * * * *